US012618412B2

(12) United States Patent
Nuhn

(10) Patent No.: US 12,618,412 B2
(45) Date of Patent: May 5, 2026

(54) PUMP FOR IMMERSION WITHIN A FLUID RESERVOIR

(71) Applicant: Nuhn Industries Ltd., Sebringville (CA)

(72) Inventor: Ian Nuhn, Stratford (CA)

(73) Assignee: Nuhn Industries Ltd., Sebringville (CA)

( * ) Notice: Subject to any disclaimer, the term of this patent is extended or adjusted under 35 U.S.C. 154(b) by 0 days.

(21) Appl. No.: 18/922,841

(22) Filed: Oct. 22, 2024

(65) Prior Publication Data

US 2025/0043793 A1      Feb. 6, 2025

Related U.S. Application Data

(63) Continuation of application No. 18/472,696, filed on Sep. 22, 2023, now abandoned, which is a
(Continued)

(51) Int. Cl.
*A01C 23/00*        (2006.01)
*A01C 3/02*        (2006.01)
(Continued)

(52) U.S. Cl.
CPC .......... *F04D 25/0686* (2013.01); *A01C 3/026* (2013.01); *A01C 3/06* (2013.01);
(Continued)

(58) Field of Classification Search
CPC ... A01C 3/026; A01C 23/00; B01F 2101/005; B01F 35/753; F04D 29/605;
(Continued)

(56) References Cited

U.S. PATENT DOCUMENTS

| | | | |
|---|---|---|---|
| 1,040,543 A | 10/1912 | Hughes | |
| 1,747,817 A | 2/1930 | Choquette | |

(Continued)

FOREIGN PATENT DOCUMENTS

| | | | |
|---|---|---|---|
| CA | 2002619 A1 | 5/1991 | |
| DE | 2364962 A1 | 7/1975 | |

(Continued)

OTHER PUBLICATIONS

Declaration of Randall G. Gorter dated Jul. 26, 2024.
(Continued)

*Primary Examiner* — Eldon T Brockman
(74) *Attorney, Agent, or Firm* — Brunet & Co. Ltd.; Robert Brunet; Hans Koenig

(57)        ABSTRACT

A pump is provided for immersion in a fluid reservoir, such as a pit or lagoon containing liquid manure, from a position at an edge of the reservoir. The pump may be adapted for connection to a farm vehicle, such as a tractor, positioned at the edge of the reservoir. The pump has a frame, a fluid conduit coupled to the frame, a housing located at a bottom end of the liquid manure pump configured to be immersed in a liquid manure reservoir, a combiner for creating a liquid manure connection between at least two liquid manure outlets of the housing and the fluid conduit, an impeller located within the housing, a drive shaft connected to the impeller, and an agitator nozzle, in fluid communication with at least one of the liquid manure outlets, for directing a portion of the liquid manure outwardly from the pump.

14 Claims, 12 Drawing Sheets

Related U.S. Application Data continuation of application No. 18/120,034, filed on Mar. 10, 2023, now abandoned, which is a continuation of application No. 17/886,031, filed on Aug. 11, 2022, now abandoned, which is a continuation of application No. 17/743,610, filed on May 13, 2022, now Pat. No. 11,448,224, which is a continuation of application No. 17/021,323, filed on Sep. 15, 2020, now abandoned, which is a continuation of application No. 16/053,331, filed on Aug. 2, 2018, now Pat. No. 10,808,707, which is a continuation of application No. 15/063,566, filed on Mar. 8, 2016, now Pat. No. 10,066,629, which is a continuation of application No. 14/570,504, filed on Dec. 15, 2014, now Pat. No. 9,488,190, which is a continuation of application No. 13/038,189, filed on Mar. 1, 2011, now Pat. No. 8,944,758.

(51) Int. Cl.

| | |
|---|---|
| *A01C 3/06* | (2006.01) |
| *A01C 23/04* | (2006.01) |
| *F04D 3/00* | (2006.01) |
| *F04D 7/02* | (2006.01) |
| *F04D 7/04* | (2006.01) |
| *F04D 13/02* | (2006.01) |
| *F04D 13/08* | (2006.01) |
| *F04D 25/06* | (2006.01) |
| *F04D 29/24* | (2006.01) |
| *F04D 29/42* | (2006.01) |
| *F04D 29/46* | (2006.01) |
| *F04D 29/60* | (2006.01) |
| *F04D 29/62* | (2006.01) |

(52) U.S. Cl.
CPC .......... *A01C 23/002* (2013.01); *A01C 23/005* (2013.01); *A01C 23/045* (2013.01); *F04D 3/00* (2013.01); *F04D 7/02* (2013.01); *F04D 7/04* (2013.01); *F04D 13/02* (2013.01); *F04D 13/08* (2013.01); *F04D 29/24* (2013.01); *F04D 29/4293* (2013.01); *F04D 29/466* (2013.01); *F04D 29/607* (2013.01); *F04D 29/628* (2013.01)

(58) Field of Classification Search
CPC .......... F04D 25/0686; F04D 3/00; F04D 7/02; F04D 7/04; F04D 13/08; F04D 29/4293; F04D 29/466; F04D 29/628
See application file for complete search history.

(56) References Cited

U.S. PATENT DOCUMENTS

| | | | | |
|---|---|---|---|---|
| 1,943,152 | A | | 1/1934 | Weiss |
| 2,578,805 | A | | 12/1951 | Johnson |
| 2,625,110 | A | * | 1/1953 | Haentjens ............... F04D 1/006 415/206 |
| 2,792,158 | A | | 5/1957 | Veitch, Sr. et al. |
| 2,890,659 | A | | 6/1959 | Haentjens et al. |
| 3,241,173 | A | * | 3/1966 | Finn ....................... A01C 15/04 37/243 |
| 3,263,968 | A | | 8/1966 | Sahlstrom |
| 3,367,583 | A | | 2/1968 | Kellogg |
| 3,384,047 | A | | 5/1968 | Remley |
| 3,417,929 | A | | 12/1968 | Secrest |
| 3,446,151 | A | | 5/1969 | Andersson |
| 3,456,592 | A | | 7/1969 | Nelsen |
| 3,537,659 | A | | 11/1970 | Vagedes |
| 3,557,981 | A | | 1/1971 | Seymour |
| 3,610,416 | A | | 10/1971 | Otto |
| 3,733,151 | A | | 5/1973 | Timmons et al. |
| 3,737,255 | A | | 6/1973 | Emeny |
| 3,824,042 | A | | 7/1974 | Barnes et al. |
| 3,860,035 | A | | 1/1975 | Semple |
| 3,905,725 | A | | 9/1975 | Johnson |
| 3,948,450 | A | * | 4/1976 | Erlitz .................... B01F 33/502 241/97 |
| 3,957,633 | A | | 5/1976 | Gatti et al. |
| 3,966,361 | A | | 6/1976 | House |
| 4,063,849 | A | * | 12/1977 | Modianos ............. F04D 29/445 415/218.1 |
| 4,145,008 | A | * | 3/1979 | Wolford .............. B02C 18/0092 241/185.6 |
| 4,214,879 | A | | 7/1980 | Whetstone et al. |
| 4,332,484 | A | | 6/1982 | Peters |
| 4,406,413 | A | | 9/1983 | Houle |
| 4,416,549 | A | | 11/1983 | Kretschmer |
| 4,445,823 | A | * | 5/1984 | Zyduck ................. F04B 53/124 417/430 |
| 4,508,272 | A | | 4/1985 | Thompson |
| 4,512,665 | A | | 4/1985 | Cline et al. |
| 4,555,063 | A | | 11/1985 | Goettsch |
| 4,572,675 | A | | 2/1986 | Roberts |
| 4,594,006 | A | * | 6/1986 | Depeault ............... A01C 3/026 417/900 |
| 4,596,511 | A | | 6/1986 | Weinrib |
| 4,616,979 | A | | 10/1986 | Hynes et al. |
| 4,618,426 | A | | 10/1986 | Mandt |
| 4,661,046 | A | * | 4/1987 | Ruyle .................... A01C 3/026 417/430 |
| 4,699,597 | A | | 10/1987 | Oja |
| 4,830,585 | A | | 5/1989 | Ruyle |
| 4,836,687 | A | | 6/1989 | Kardoes et al. |
| 4,874,575 | A | | 10/1989 | Dunn et al. |
| 4,896,445 | A | | 1/1990 | Deal |
| 4,904,159 | A | * | 2/1990 | Wickoren .............. F04D 7/045 415/121.1 |
| 4,971,526 | A | | 11/1990 | Ruyle |
| 5,100,303 | A | | 3/1992 | Depault |
| 5,141,390 | A | * | 8/1992 | Haentjens ........... F04D 15/0022 415/206 |
| 5,267,830 | A | | 12/1993 | Wickoren et al. |
| 5,435,664 | A | | 7/1995 | Pettersson |
| 5,624,241 | A | | 4/1997 | Nesseth |
| 6,276,824 | B1 | | 8/2001 | De Jager |
| 6,406,255 | B1 | | 6/2002 | Angelle |
| 6,520,750 | B2 | | 2/2003 | Eller et al. |
| 6,922,922 | B2 | | 8/2005 | Cheramie |
| 7,159,889 | B2 | | 1/2007 | Nuhn et al. |
| 7,478,817 | B1 | | 1/2009 | Carrier |
| 7,585,135 | B1 | | 9/2009 | Deal, Jr. |
| 7,797,789 | B2 | | 9/2010 | Nuhn |
| 8,899,165 | B2 | | 12/2014 | Puck |
| 8,939,637 | B2 | | 1/2015 | Depault |
| 9,462,741 | B2 | | 10/2016 | Puck |
| 9,572,297 | B2 | | 2/2017 | Puck |
| 2012/0185129 | A1 | | 7/2012 | Carrier |
| 2013/0145980 | A1 | | 6/2013 | Puck |
| 2014/0112093 | A1 | | 4/2014 | Puck |

FOREIGN PATENT DOCUMENTS

| | | | |
|---|---|---|---|
| DE | 2818501 | A1 | 8/1979 |
| DE | 3431345 | A1 | 3/1986 |
| DE | 8218017 | U1 | 10/1986 |
| DE | 3711015 | | 10/1988 |
| DE | 19527977 | A1 | 12/1996 |
| EP | 0325091 | A1 | 7/1989 |
| EP | 730 094 | B1 | 4/2000 |
| EP | 1782882 | A1 | 5/2007 |
| GB | 1493119 | A | 11/1977 |
| GB | 2049384 | A | 12/1980 |
| GB | 2110101 | A | 6/1983 |
| GB | 2349101 | A | 10/2000 |
| GB | 2366218 | A | 3/2002 |
| JP | 2001037903 | A | 2/2001 |

(56) References Cited

FOREIGN PATENT DOCUMENTS

| KR | 20130016490 | A | 2/2013 |
| RU | 131561 | U1 | 8/2013 |

OTHER PUBLICATIONS

Exhibit A of Declaration of Randall G. Gorter dated Jul. 26, 2024.
Exhibit B of Declaration of Randall G. Gorter dated Jul. 26, 2024.
Request for Ex Parte Reexamination dated Apr. 4, 2015 on U.S. Appl. No. 11/448,224.
Request for Ex Parte Reexamination dated Apr. 4, 2015 on U.S. Appl. No. 11/448,224—Exhibit 1001.
Request for Ex Parte Reexamination dated Apr. 4, 2015 on U.S. Appl. No. 11/448,224—Exhibit 1002.
Request for Ex Parte Reexamination dated Apr. 4, 2015 on U.S. Appl. No. 11/448,224—Exhibit 1003.
Request for Ex Parte Reexamination dated Apr. 4, 2015 on U.S. Appl. No. 11/448,224—Exhibit 1004—Part 1.
Request for Ex Parte Reexamination dated Apr. 4, 2015 on U.S. Appl. No. 11/448,224—Exhibit 1004—Part 2.
Request for Ex Parte Reexamination dated Apr. 4, 2015 on U.S. Appl. No. 11/448,224—Exhibit 1005.
Request for Ex Parte Reexamination dated Apr. 4, 2015 on U.S. Appl. No. 11/448,224—Exhibit 1006.
Request for Ex Parte Reexamination dated Apr. 4, 2015 on U.S. Appl. No. 11/448,224—Exhibit 1007.
Request for Ex Parte Reexamination dated Apr. 4, 2015 on U.S. Appl. No. 11/448,224—Exhibit 1008.
Request for Ex Parte Reexamination dated Apr. 4, 2015 on U.S. Appl. No. 11/448,224—Exhibit 1009.
Request for Ex Parte Reexamination dated Apr. 4, 2015 on U.S. Appl. No. 11/448,224—Exhibit 1010.
Request for Ex Parte Reexamination dated Apr. 4, 2015 on U.S. Appl. No. 11/448,224—Exhibit 1011.
Request for Ex Parte Reexamination dated Apr. 4, 2015 on U.S. Appl. No. 11/448,224—Exhibit 1012.
Request for Ex Parte Reexamination dated Apr. 4, 2015 on U.S. Appl. No. 11/448,224—Exhibit 1013.
Request for Ex Parte Reexamination dated Apr. 4, 2015 on U.S. Appl. No. 11/448,224—Exhibit 1014.
Request for Ex Parte Reexamination dated Apr. 4, 2015 on U.S. Appl. No. 11/448,224—Exhibit 1015.
Request for Ex Parte Reexamination dated Apr. 4, 2015 on U.S. Appl. No. 11/448,224—Exhibit 1016.
Request for Ex Parte Reexamination dated Apr. 4, 2015 on U.S. Appl. No. 11/448,224—Exhibit 1017.
Request for Ex Parte Reexamination dated Apr. 4, 2015 on U.S. Appl. No. 11/448,224—Exhibit 1018.
Request for Ex Parte Reexamination dated Apr. 4, 2015 on U.S. Appl. No. 11/448,224—Exhibit 1019.
Request for Ex Parte Reexamination dated Apr. 4, 2015 on U.S. Appl. No. 11/448,224—Exhibit 1020.
Request for Ex Parte Reexamination dated Apr. 4, 2015 on U.S. Appl. No. 11/448,224—Exhibit 1021.
Request for Ex Parte Reexamination dated Apr. 4, 2015 on U.S. Appl. No. 11/448,224—Exhibit 1022.
Request for Ex Parte Reexamination dated Apr. 4, 2015 on U.S. Appl. No. 11/448,224—Exhibit 1023.
Request for Ex Parte Reexamination dated Apr. 4, 2015 on U.S. Appl. No. 11/448,224—Exhibit 1024.
Request for Ex Parte Reexamination dated Apr. 4, 2015 on U.S. Appl. No. 11/448,224—Exhibit 1025.
Request for Ex Parte Reexamination dated Apr. 4, 2015 on U.S. Appl. No. 11/448,224—Exhibit 1026.
Request for Ex Parte Reexamination dated Apr. 4, 2015 on U.S. Appl. No. 11/448,224—Exhibit 1027.
SDIA64—InitialInvalidityContentions—Part1a Defendant Bazooka Farmstar, LLC's Initial Invalidity Contentions in *Nuhn Industries Ltd.* v. *Bazooka Farmstar, LLC*, U.S. District Court for the Southern District of Iowa, Case No. 3:22-cv-00064-SMR-HCA served on May 5, 2023—Part 1a.
SDIA64—InitialInvalidityContentions—Part1b Defendant Bazooka Farmstar, LLC's Initial Invalidity Contentions in *Nuhn Industries Ltd.* v. *Bazooka Farmstar*, LLC, U.S. District Court for the Southern District of Iowa, Case No. 3:22-cv-00064-SMR-HCA served on May 5, 2023—Part 1b.
SDIA64—InitialInvalidityContentions—Part2 Defendant Bazooka Farmstar, LLC's Initial Invalidity Contentions in *Nuhn Industries Ltd.* v. *Bazooka Farmstar, LLC*, U.S. District Court for the Southern District of Iowa, Case No. 3:22-cv-00064-SMR-HCA served on May 5, 2023 - Part 2.
SDIA64—InitialInvalidityContentions—Part3 Defendant Bazooka Farmstar, LLC's Initial Invalidity Contentions in *Nuhn Industries Ltd.* v. *Bazooka Farmstar, LLC*, U.S. District Court for the Southern District of Iowa, Case No. 3:22-cv-00064-SMR-HCA served on May 5, 2023—Part 3.
SDIA64—InitialInvalidityContentions—Part4 Defendant Bazooka Farmstar, LLC's Initial Invalidity Contentions in *Nuhn Industries Ltd.* v. *Bazooka Farmstar, LLC*, U.S. District Court for the Southern District of Iowa, Case No. 3:22-cv-00064-SMR-HCA served on May 5, 2023—Part 4.
SDIA64—InitialInvalidityContentions—Part5 Defendant Bazooka Farmstar, LLC's Initial Invalidity Contentions in *Nuhn Industries Ltd.* v. *Bazooka Farmstar, LLC*, U.S. District Court for the Southern District of Iowa, Case No. 3:22-cv-00064-SMR-HCA served on May 5, 2023—Part 5.
SDIA76-ECF-14 Defendant Bazooka Farmstar, LLC's Answer in *Nuhn Industries Ltd.* v. *Bazooka Farmstar, LLC*, U.S. District Court for the Southern District of Iowa, Case No. 3:22-cv-00076-SMR-HCA filed Jan. 20, 2023 (ECF 14, 14-01, 14-02, 14-03, 14-04).
SDIA76-ECF-23 Plaintiff Nuhn Industries Ltd.'s Motion to Dismiss Defendant Bazooka Farmstar, LLC's Counterclaims in *Nuhn Industries Ltd.* v. *Bazooka Farmstar, LLC*, U.S. District Court for the Southern District of Iowa, Case No. 3:22-cv-00076-SMR-HCA filed Feb. 10, 2023 (ECF 23, 23-01, 23-02, 23-03, 23-04, 23-05, 23-06, 23-07, 23-08, 23-09, 23-10, 23-11, 23-12, 23-13, 23-14).
SDIA76-ECF-24—Part1 Defendant Bazooka Farmstar, LLC's First Amended Answer in *Nuhn Industries Ltd.* v. *Bazooka Farmstar, LLC*, U.S. District Court for the Southern District of Iowa, Case No. 3:22-cv-00076-SMR-HCA filed Feb. 24, 2023 (ECF 24, 24-01, 24-02, 24-03, 24-04, 24-05)—Part 1.
SDIA76-ECF-24—Part2 Defendant Bazooka Farmstar, LLC's First Amended Answer in *Nuhn Industries Ltd.* v. *Bazooka Farmstar, LLC*, U.S. District Court for the Southern District of Iowa, Case No. 3:22-cv-00076-SMR-HCA filed Feb. 24, 2023 (ECF 24, 24-01, 24-02, 24-03, 24-04, 24-05)—Part 2.
SDIA76-ECF-24—Part3 Defendant Bazooka Farmstar, LLC's First Amended Answer in *Nuhn Industries Ltd.* v. *Bazooka Farmstar, LLC*, U.S. District Court for the Southern District of Iowa, Case No. 3:22-cv-00076-SMR-HCA filed Feb. 24, 2023 (ECF 24, 24-01, 24-02, 24-03, 24-04, 24-05)—Part 3.
SDIA76-ECF-24—Part4 Defendant Bazooka Farmstar, LLC's First Amended Answer in *Nuhn Industries Ltd.* v. *Bazooka Farmstar, LLC*, U.S. District Court for the Southern District of Iowa, Case No. 3:22-cv-00076-SMR-HCA filed Feb. 24, 2023 (ECF 24, 24-01, 24-02, 24-03, 24-04, 24-05)—Part 4.
SDIA76-ECF-25 Plaintiff Nuhn Industries Ltd.'s Motion to Dismiss Defendant Bazooka Farmstar, LLC's First Amended Answer in *Nuhn Industries Ltd.* v. *Bazooka Farmstar, LLC*, U.S. District Court for the Southern District of Iowa, Case No. 3:22- cv-00076-SMR-HCA filed Mar. 10, 2023 (ECF 25, 25-01, 25-02, 25-03, 25-04, 25-05, 25-06, 25-07, 25-08, 25-09, 25-10, 25-11, 25-12, 25-13, 25-14).
SDIA76-ECF-27 Defendant Bazooka Farmstar, LLC's Response in Opposition to Plaintiff Nuhn Industries Ltd.'s Motion to Dismiss Defendant Bazooka Farmstar, LLC's First Amended Answer in *Nuhn Industries Ltd.* v. *Bazooka Farmstar, LLC*, U.S. District Court for the Southern District of Iowa, Case No. 3:22-cv-00076-SMR-HCA filed Mar. 24, 2023 (ECF 27).
SDIA76-ECF-29 Plaintiff Nuhn Industries Ltd.'s Reply in Support of its Motion to Dismiss Defendant Bazooka Farmstar, LLC's First

(56)                References Cited

OTHER PUBLICATIONS

Amended Answer in *Nuhn Industries Ltd.* v. *Bazooka Farmstar, LLC*, U.S. District Court for the Southern District of Iowa, Case No. 3:22-cv-00076-SMR-HCA filed Mar. 31, 2023 (ECF 29).
Request for Ex Parte Reexamination dated Jun. 30, 2023 on U.S. Appl. No. 11/448,224—Part 1.
Request for Ex Parte Reexamination dated Jun. 30, 2023 on U.S. Appl. No. 11/448,224—Part 2.
Request for Ex Parte Reexamination dated Jun. 30, 2023 on U.S. Appl. No. 11/448,224—Part 3.
Request for Ex Parte Reexamination dated Jun. 30, 2023 on U.S. Appl. No. 11/448,224—Part 4.
Request for Ex Parte Reexamination dated Jun. 30, 2023 on U.S. Appl. No. 11/448,224—Part 5.
Request for Ex Parte Reexamination dated Jun. 30, 2023 on U.S. Appl. No. 11/448,224—Part 6.
Request for Ex Parte Reexamination dated Jun. 30, 2023 on U.S. Appl. No. 11/448,224—Part 7.
Request for Ex Parte Reexamination dated Jun. 30, 2023 on U.S. Appl. No. 11/448,224—Part 8.
Request for Ex Parte Reexamination dated Jun. 30, 2023 on U.S. Appl. No. 11/448,224—Part 9.
Request for Ex Parte Reexamination dated Jun. 30, 2023 on U.S. Appl. No. 11/448,224—Part 10.
Request for Ex Parte Reexamination dated Jun. 30, 2023 on U.S. Appl. No. 11/448,224—Part 11.
Request for Ex Parte Reexamination dated Jun. 30, 2023 on U.S. Appl. No. 11/448,224—Part 12.
Request for Ex Parte Reexamination dated Jun. 30, 2023 on U.S. Appl. No. 11/448,224—Part 13.
Request for Ex Parte Reexamination dated Jun. 30, 2023 on U.S. Appl. No. 11/448,224—Part 14.
Request for Ex Parte Reexamination dated Jun. 30, 2023 on U.S. Appl. No. 11/448,224—Part 15.
Request for Ex Parte Reexamination dated Jun. 30, 2023 on U.S. Appl. No. 11/448,224—Part 16.
Request for Ex Parte Reexamination dated Jun. 30, 2023 on U.S. Appl. No. 11/448,224—Part 17.
Request for Ex Parte Reexamination dated Jun. 30, 2023 on U.S. Appl. No. 11/448,224—Part 18.
Request for Ex Parte Reexamination dated Jun. 30, 2023 on U.S. Appl. No. 11/448,224—Part 19.
Request for Ex Parte Reexamination dated Jun. 30, 2023 on U.S. Appl. No. 11/448,224—Part 20.
EX1039—Jun. 29, 2023 Defendant's Stipulation of Invalidity Contentions. *Nuhn Industries Ltd.* v. *Bazooka Farmstar, LLC.* in the United States District Court for the Southern District of Iowa Eastern Division. Case No. 3:22-cv-00015-SMR-HCA.
EX1004—Declaration of Eric S. Winkel, Ph.D., P.E. dated Jun. 29, 2023 in Support of Petition for Inter Partes Review of U.S. Pat. No. 11,358,425. Part 1.
EX1004—Declaration of Eric S. Winkel, Ph.D., P.E. dated Jun. 29, 2023 in Support of Petition for Inter Partes Review of U.S. Pat. No. 11,358,425. Part 2.
EX1019—Lyseng R. Float your boat in a slurry moat. The Western Producer. Aug. 29, 2013.
EX1009—Truxor-ArchiveOrgAffidavit Dec. 12, 2022 about Truxor DM 5000 brochure Feb. 17, 2010.
EX1023—TruxorExG-Truxor_2012_ENG. Truxor Amphibian tool carrier brochure.
EX1021—TruxorExE-Truxor2013-USinchFloridAquaticJohnFarell. Truxor Amphibian tool carrier brochure.
EX1022—Truxor Ex F 2013 US inch Hockney. Truxor Amphibian tool carrier brochure.
EX1008—Truxor-DeclarationRediarOlofsson dated Feb. 27, 2023. Part 1.
EX1008—Truxor-DeclarationRediarOlofsson dated Feb. 27, 2023. Part 2.
EX1008—Truxor-DeclarationRediarOlofsson dated Feb. 27, 2023. Part 3.
EX1007—Truxor-DeclarationJanDavidArnoldsson dated Mar. 26, 2023. Part 1.
EX1007—Truxor-DeclarationJanDavidArnoldsson dated Mar. 26, 2023. Part 2.
EX1007—Truxor-DeclarationJanDavidArnoldsson dated Mar. 26, 2023. Part 3.
EX1027—Berky Newspaper. The frog as a role model. Aug. 25, 2011.
EX1013—Berky-DeclarationAnsgarLonnemann dated Jun. 15, 2023.
EX1028—ExhibitB—VideoScreenshots—AmphiKing. May 3, 2012.
EX1012—SenwaTec1. Senwatec Amphi-King brochure. Aug. 19, 2013.
EX1042—Pfost D et al. Beef Manure Management Systems in Missouri. Published by MU Extension, University of Missouri-Columbia. Published in 2000.
EX1044—ANSI/HI 9.6.7-2010. Effects of Liquid Viscosity on Rotodynamic (Centrifugal and Vertical) Pump Performance.
EX1045—Thygesen O, et al. Indicators of Physical Properties and Plant Nutrient Content of Animal Slurry and Separated Slurry. Transactions of the ASABE, 2012.
EX1047—Marks R. Cesspools of Shame. How Factory Farm Lagoons and Sprayfields Threaten Environmental and Public Health. Natural Resources Defense Council and the Clean Water Network, Jul. 2001.
EX1048—Bowman DD, et al. Manure Pathogens: Real Issued and Real Risks. Jan. 2000.
EX1057—Yeaple F. Fluid Power Design Handbook, Third Edition, Revised and Expanded. Preface and Chapter 10. 1995.
EX1060—Odgers E, et al. Manure Gas Safety. Review of Practices and Recommendations for Wisconsin Livestock Farms. 2008.
EX1058—Fulhage CD. Solids Removal From Livestock Manure Lagoons. Published by MU Extension, University of Missouri-Columbia. Nov. 1994.
EX1062—Part 651 Agricultural Waste Management Field Handbook. Chapter 4. Agricultural Waste Characteristics. United States Department of Agriculture, Natural Resources Conservation Service. 2008.
EX1063—Part 651 Agricultural Waste Management Field Handbook. Chapter 10. Agricultural Waste Management System Component Design. United States Department of Agriculture, Natural Resources Conservation Service. 2009.
EX1064—Part 651 Agricultural Waste Management Field Handbook. Chapter 11. Waste Utilization. United States Department of Agriculture, Natural Resources Conservation Service. 2013.
EX1066—Part 651 Agricultural Waste Management Field Handbook. Chapter 12. Waste Management Equipment. United States Department of Agriculture, Natural Resources Conservation Service. 2011.
EX1067—Part 651 Agricultural Waste Management Field Handbook. Chapter 13. Operation, Maintenance, and Safety. United States Department of Agriculture, Natural Resources Conservation Service. 2011.
EX1040—Dougherty M, et al. Liquid Manure Application Systems Design Manual. Northeast Regional Agricultural Engineering Service (NRAES) Cooperative Extension. 1998. Part 1.
EX1040—Dougherty M, et al. Liquid Manure Application Systems Design Manual. Northeast Regional Agricultural Engineering Service (NRAES) Cooperative Extension. 1998. Part 2.
EX1040—Dougherty M, et al. Liquid Manure Application Systems Design Manual. Northeast Regional Agricultural Engineering Service (NRAES) Cooperative Extension. 1998. Part 3.
EX1040—Dougherty M, et al. Liquid Manure Application Systems Design Manual. Northeast Regional Agricultural Engineering Service (NRAES) Cooperative Extension. 1998. Part 4. (EX1040).
EX1040—Dougherty M, et al. Liquid Manure Application Systems Design Manual. Northeast Regional Agricultural Engineering Service (NRAES) Cooperative Extension. 1998. Part 5. (EX1040).
EX1040—Dougherty M, et al. Liquid Manure Application Systems Design Manual. Northeast Regional Agricultural Engineering Service (NRAES) Cooperative Extension. 1998. Part 6. (EX1040).

(56) References Cited

OTHER PUBLICATIONS

EX1040—Dougherty M, et al. Liquid Manure Application Systems Design Manual. Northeast Regional Agricultural Engineering Service (NRAES) Cooperative Extension. 1998. Part 7. (EX1040).

EX1040—Dougherty M, et al. Liquid Manure Application Systems Design Manual. Northeast Regional Agricultural Engineering Service (NRAES) Cooperative Extension. 1998. Part 8. (EX1040).

EX1050—Preventing Deaths of Farm Workers in Manure Pits. The National Institute for Occupational Safety and Health (NIOSH). 1990.

EX1053—Manure Storage Safety. ASAE EP470 Jan. 1992 (R2005). pp. 796-800.

EX1054—Livestock Waste Facilities Handbook, Third Edition, 1993. MidWest Plan Service. Iowas State University. Part 1.

EX1054—Livestock Waste Facilities Handbook, Third Edition, 1993. MidWest Plan Service. Iowas State University. Part 2.

EX1056—Safley LM, et al. Corrosion of Galvanized Steel in Animal Waste Environments. Bioresource Technology 40 (1992) 53-61.

U.S. Appl. No. 61/805,113, filed Mar. 25, 2013.

Jun. 30, 2023 Petition dated Jun. 30, 2023 for Inter Partes Review of U.S. Pat. No. 11,358,425.

Notice of Intent to Issue Ex Parte Reexamination Certificate dated Dec. 21, 2023 on U.S. Appl. No. 90/019,224, which is a reexamination of U.S. Pat. No. 11,448,224.

Office action dated Aug. 2, 2013 on U.S. Appl. No. 13/038,189.

Office action dated Apr. 9, 2014 on U.S. Appl. No. 13/038,189.

Office action dated Oct. 2, 2015 on U.S. Appl. No. 14/570,504.

Office action dated May 6, 2016 on U.S. Appl. No. 14/570,504.

Office action dated Aug. 30, 2016 on CA 2733049.

Office action dated Jan. 16, 2017 on CA2733049.

Office action dated Jan. 5, 2018 on U.S. Appl. No. 15/063,566.

Office action dated Jan. 17, 2020 on U.S. Appl. No. 16/053,331.

Office action dated May 19, 2020 on U.S. Appl. No. 16/053,331.

Interview summary dated Aug. 18, 2020 on U.S. Appl. No. 16/053,331.

Office action dated Apr. 24, 2024 on U.S. Appl. No. 18/472,696.

Power-take-off pumps. Huning Brand Gulletechnik. http://www.brnad-melle.de/31-1-Power-take-off+pumps.html dated Sep. 12, 2013.

Fisher Manure Pumps Brochure, 2002, BAZ000013.

Fisher Pump Belt Drive Vertical Pump, 1993, BAZ000012.

Fisher Pumps Owners Manual, 2007, BAZ000054.

Houle Website: Super Pompe, 2007, BAZ000120.

Husky Farm Equipment Brochure, 1985, BAZ000083.

Husky Liquid Manure H5000 Pump Parts Manual. 1982, BAZ000061.

Husky Liquid Manure Pump H5000/H6000 Operators Manual, 1995, BAZ000121.

Manure Manager, vol. 7, No. 5, p. p. 11 (Annex Publishing & Printing Inc., Simcoe, Ontario, Canada, Jul./Aug. 2009). BAZ000014—Part1.

Manure Manager, vol. 7, No. 5, p. p. 11 (Annex Publishing & Printing Inc., Simcoe, Ontario, Canada, Jul./Aug. 2009). BAZ000014—Part2.

Manure Manager, vol. 7, No. 5, p. p. 11 (Annex Publishing & Printing Inc., Simcoe, Ontario, Canada, Jul./Aug. 2009). BAZ000014—Part3.

Manure Manager, vol. 7, No. 5, p. 11 (Annex Publishing & Printing Inc., Simcoe, Ontario, Canada, Jul./Aug. 2009). BAZ000014—Part4.

Manure Manager, vol. 9, No. 4, p. 23 (Annex Publishing & Printing Inc., Simcoe, Ontario, Canada, Jul./Aug. 2011).

PHILS0000001—PHILS0000010—Photographs of a pump (Produced by third-party Phil's Pumping & Fabrication, Inc. on Jun. 26, 2025 in *Nuhn Industries Ltd.* v. *Bazooka Farmstar, LLC*, U.S. District Court for the Southern District of Iowa, Case No. 3:22-cv-00015-SMR-HCA).

PHILS0000559—PHILS0000560—Photographs of a pump impeller (Produced by third-party Phil's Pumping & Fabrication, Inc. on Jun. 26, 2025 in *Nuhn Industries Ltd.* v. *Bazooka Farmstar, LLC*, U.S. District Court for the Southern District of Iowa, Case No. 3:22-cv-00015-SMR-HCA).

PHILS0000561—PHILS0000617—Declaration of Phil Schneider dated Jun. 25, 2025 (Produced by third-party Phil's Pumping & Fabrication, Inc. on Jun. 26, 2025 in *Nuhn Industries Ltd.* v. *Bazooka Farmstar, LLC*, U.S. District Court for the Southern District of Iowa, Case No. 3:22-cv-00015-SMR-HCA).

2008 Hydro Engineering's Accessory Parts Catalog.

Affidavit of Nathaniel E Frank-White, a Records Request Processor at the Internet Archive, executed Dec. 12, 2022, regarding Truxor website printouts (within Exhibit A to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).

Affidavit of Nathaniel E Frank-White, dated Jul. 18, 2023, and Exhibit A, 12 pages.

Annex Publishing & Printing Inc., Manure Manager, Jan./Feb. 2011.

Annex Publishing & Printing Inc., Manure Manager, Jan./Feb. 2012.

Annex Publishing & Printing Inc., Manure Manager, Jul./Aug. 2011.

Annex Publishing & Printing Inc., Manure Manager, Jul./Aug. 2013.

Annex Publishing & Printing Inc., Manure Manager, Nov./Dec. 2010.

Balzer's V-6 Pump High vol. Pit Pumps Brochure (document undated).

Burrows Enterprises, LLC (Fisher Pumps Division), Image of Fisher Pump Belt Drive Vertical Pump (allegedly available at least as early as 1993) (produced by Bazooka-Farmstar, LLC as BAZ000012).

C550-M872-DSC_0014.JPG—Photograph of Conver C550 (Produced by Alamo Group, Inc. on Jun. 7, 2024 pursuant to subpoena issued by Bazooka in *Nuhn Industries Ltd.* v. *Bazooka Farmstar, LLC*, U.S. District Court for the Southern District of Iowa, Case No. 3:22-cv-00015-SMR-HCA and alleged to predate Jan. 1, 2014).

Calumet Brochure (2003).

Charles D. Fulhage, Solids Removal from Livestock Manure Lagoons, U. Mo. Extension (Nov. 1995), https:// extension.missouri.edu/publications/wq324.

Claim Construction Briefing in SDIA 15 Case—J.M. Langner & E.L. Bibeau, Properties of Naturally Settled Hog Manure in Outdoor Lagoons, 52 Transactions ASAE 2067 (2009) (ECF 132-36 in *Nuhn Industries Ltd.* v. *Bazooka Farmstar, LLC*, U.S. District Court for the Southern District of Iowa, Case No. 3:22-cv-00015-SMR-HCA).

Claire E. Marcato et al., Particle size and metal distributions in anaerobically digested pig slurry, 99(7) Bioresource Technology 2340 (2008) (EX1098 in IPR2023-01161).

Conrad B Gilbertson et al., Pumping Liquid Manure from Swine Lagoons and Holding Ponds, in Pork Industry Handbook (1984) (EX1101 in IPR2023-01161).

Cornell Redi-Prime Pump Brochure (undated).

Daniel L. Pfost et al., Univ. of Mo. Extension, Anaerobic Lagoons for Storage/Treatment of Livestock Manure (Oct. 2000) (EX2019 to IPR2023-01161).

Deanne Meyer et al., Particle Size and Nutrient Distribution in Fresh Dairy Manure, 23(1) Applied Engineering in Agriculture 113 (2007) (EX1099 in IPR2023-01161).

Declaration of Ansgar Lonnemann, Dated Jun. 15, 2023.

Declaration of Ansgar Lonnemann, sales manager of Berky GmbH, executed Jun. 15 (declaration does not include a year), making allegations regarding alleged prior art related to Senwatec cited in Exhibits A, B, and C thereto (EX1013 to IPR2023-01161, IPR2024-00004, and IPR2024-00098).

Declaration of Eckhard Funck with Exhibits A-H dated Mar. 8, 2024 (English Translation).

Declaration of Eckhard Funck with Exhibits A-H dated Mar. 8, 2024 (German).

Declaration of Jan David Arnoldson, CEO of Truxor Wetland Equipment AB, executed Mar. 26, 2023, making allegations regarding alleged prior art related to Truxor cited in Exhibits A, B, C, D, E, F, G, H, I, J, and K thereto (EX1007 to IPR2023-01161, IPR2024-00004, and IPR2024-00098).

Declaration of Jan David Arnoldsson, Dated Feb. 26, 2023.

(56)        References Cited

OTHER PUBLICATIONS

Declaration of Reidar Olofsson, Dated Feb. 27, 2023.
Declaration of Reidar Olofsson, Mechanical Engineer of Truxor Wetland Equipment AB, executed Feb. 27, 2023, making allegations regarding alleged prior art related to Truxor cited in Exhibits A, B, C, D, E, F, G, H, I, J, and K thereto (EX1008 to IPR2023-01161, IPR2024-00004, and IPR2024-00098).
Declaration of Reinhard Speerschneider with Exhibits A & B dated Apr. 24, 2024 (English Translation).
Declaration of Reinhard Speerschneider with Exhibits A & B dated Apr. 24, 2024 (German).
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit A—Claim Chart—Alleged Prior Sales, Disclosure or Use of Nuhn Dual Port Header Series Pump.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit B—Claim Chart—Alleged Nuhn Dual Port Header Series Brochure.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit C—Claim Chart—Alleged Husky Liquid Manure H5000 Pump Parts Manual.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit D—Claim Chart—Alleged Husky Liquid Manure H5000 Pump Brochure.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit E—Claim Chart—Alleged Prior Sales, Disclosure or Use of Husky Liquid Manure H5000 Pump.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit F—Claim Chart—Combination of Alleged GEA Houle Publications and Alleged Fisher Prior Art.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit G—Claim Chart—Combination of Alleged GEA Houle Publications and U.S. Pat. No. 2,625,110.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit H—Claim Chart—Combination of Alleged GEA Houle Publications and U.S. Pat. No. 3,367,583.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit I—Claim Chart—Combination of Alleged GEA Houle Publications and U.S. Pat. No. 4,063,849.

Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit J—Claim Chart—Combination of Alleged GEA Houle Publications and U.S. Pat. No. 3,733,151.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit K—Claim Chart—Combination of Alleged Husky Prior Art and Alleged Fisher Prior Art.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit L—Claim Chart—Combination of Alleged Husky Prior Art and U.S. Pat. No. 2,625,110.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit M—Claim Chart—Combination of Alleged Husky Prior Art and U.S. Pat. No. 3,367,583.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit N—Claim Chart—Combination of Alleged Husky Prior Art and U.S. Pat. No. 4,063,849.
Defendant Bazooka Farmstar, LLC's Initial Invalidity Contentions regarding U.S. Pat. No. 11,448,224 in *Nuhn Industries Ltd.* v. *Bazooka Farmstar, LLC*, U.S. District Court for the Southern District of Iowa, Case No. 3:22-cv-00064-SMR-HCA served on May 5, 2023—Exhibit O—Claim Chart—Combination of Alleged Husky Prior Art and U.S. Pat. No. 3,733,151.
Der Frosch als Vorbild, allegedly dated Aug. 25, 2011, https://www.hna.de/lokales/rotenburgbebra/frosch-vorbild-1376974.html (Exhibit A to Lonnemann Declaration (EX1013 to IPR2023-01161, IPR2024-00004, and IPR2024-00098); EX1026 to IPR2023-01161; EX1025 to IPR2024-00004; and EX1029 to IPR2024-00098).
Donald L. Pfost & Charles D. Fulhage, U. Mo. Extension, Beef Manure Management Systems in Missouri (2000).
Dorotea Mekaniska AB, Truxor Amphibian Tool Carrier (2013) (Truxor-II).
Dorotea Mekaniska AB, Truxor Amphibian Tool Carrier (2013) (Truxor-III).
Dorotea Mekaniska AB, Truxor Amphibian Tool Carrier (Truxor) allegedly publicly available as of 2009.
Dorotea Mekaniska AB, Truxor Amphibian Tool Carrier (Truxor-IV).
Effects of Liquid Viscosity on Rotodynamic (Centrifugal and Vertical) Pump Performance (Am. Nat'l Standards Inst. 2010).
Engineering drawing and parts list of LJ1003 slurry pump, allegedly dated Jan. 3, 2006 (Exhibit J to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098).
English Translation of Der Frosch als Vorbild (EX1027) and Declaration of Beverly Santamaria, Dated Jun. 8, 2023.
Envtl. Prot. Agency, Primer for Municipal Wastewater Treatment Systems (Sep. 2004) (EX2022 to IPR2023-01161).
EX1006—Truxor09-ENG. Truxor Amphibian tool carrier brochure. Aug. 18, 2010.
EX1009—Truxor-ArchiveOrgAffidavit. Truxor DM 5000 brochure. Dec. 12, 2022.
Fisher Pumps, Inc., Fisher Pumps allegedly publicly available as of 2009.
H. Landry et al., Physical and Rheological Properties of Manure Products, Applied Engineering in Agriculture, at 278 (2004) (EX2033 in IPR2023-01161).

(56) References Cited

OTHER PUBLICATIONS

Houle Manure Pumps and Agitators brochure 2002 (Exhibit A to Declaration of Randall G. Gorter, Head of Market Support at GEA Farm Technologies, Inc. dated Jul. 26, 2024).
Houle Pumps and Valves for Flush Systems brochure 2001 (Exhibit B to Declaration of Randall G. Gorter, Head of Market Support at GEA Farm Technologies, Inc. dated Jul. 26, 2024).
Jamesway Pumpeller Hybrid Lagoon Pump Brochure (document undated).
Jamesway Vertical Electric Pumps Brochure (document undated).
John P. Chastain & Stephen Henry, Management of Lagoons and Storage Structures for Dairy Manure (2004).
Jones DD, et al. Closure of Earthen Manure Structures. University of Nebraska—Lincoln. Aug. 2006.
K. Smith et al., Natural Crusting Of Slurry Storage As An Abatement Measure For Ammonia Emissions On Dairy Farms, 97 Biosystems Engineering 464 (2007) (EX2030 in IPR2023-01161).
L.M. Staley et al., Flow Properties of Dairy Waste Slurries, Canadian Agricultural Engineering, vol. 15, No. 2, Dec. 1973.
M. Kumar et al., Flow Properties of Animal Waste Slurries, 15(4) Transactions of the ASAE 718 (1972) (EX1128 in IPR2023-01161).
Manure Manager, "Dane County community digester, Wisconsin hopes for cleaner lakes with Cow Power investments," Sep./Oct. 2011, 6 pages.
Manure Manager, On Track: Jan./Feb. 2009, <https://www.manuremanager.com/on-track-2044/> (EX1073 in IPR2023-01161).
Manure Manager, Sep./Oct. 2014 (EX1074 in IPR2023-01161) (see p. 25).
MidWest Plan Serv., Livestock Waste Facilities Handbook (3d ed. 1993).
MidWest Plan Service, Manure Characteristics, Manure Management Systems Series, MWPS-18 Section 1 (2d ed. 2004).
Nuhn Advertisement, Prairie Farmer, Aug. 1, 2011.
Nuhn Advertisement, Prairie Hog Country, Jun./Jul. 2011.
Nuhn G-Force Vertical Pit Pump Advertisement, Ontario Farmer, Jun. 7, 2011.
Nuhn Header Series Lagoon Pump Advertisement, Progressive Dairyman, Jan. 1, 2013.
Nuhn Industries Ltd., Articulated Pump Brochure (Feb. 1, 2012).
Nuhn Industries Ltd., G-Force Lagoon Pump Brochure (2008).
Nuhn Industries Ltd., Header Series Lagoon Pump Brochure (Aug. 2, 2013).
Nuhn Industries Ltd., Header Series Lagoon Pump Brochure (Sep. 20, 2012).
Nuhn Industries Ltd., Header Series Vertical Pit Pump Brochure (May 21, 2013).
Nuhn Industries Ltd., Header Series Vertical Pit Pump Brochure (Sep. 20, 2012).
Nuhn Industries Ltd., PTO Pump Brochure (2008).
Nuhn Industries Ltd., Vertical Pit Pump Brochure (Sept. 1, 2010).
Nuhn Reference and Declaration of Nathaniel E Frank-White, Dated Jul. 18, 2023 (Nuhn Reference).
Nuhn Vertical Pit Pump Brochure (Oct. 10, 2010).
Office action dated Nov. 25, 2022 on U.S. Appl. No. 17/886,031.
Office action dated Jun. 23, 2023 on U.S. Appl. No. 17/886,031.
Office action dated Jul. 6, 2023 on U.S. Appl. No. 18/120,034.
Office Action in U.S. Appl. No. 17/021,323 dated Sep. 30, 2021.
Office Action in U.S. Appl. No. 18/472,696 dated Apr. 24, 2024.
Photographs of the SenwaTec Amphi-King (produced in the *Nuhn Indus. Ltd.* v. *Bazooka Farmstar, LLC*, Case No. 3:22-cv-00015-SMR-HCA in the US District Court for the Southern District of Iowa as BAZ15_0024426-621) (Publicly filed by Bazooka Farmstar on Aug. 6, 2024 as EX1131 in IPR2023-01161).
Printout of Google Search on Jan. 31, 2023 of "amphibious and machine and pump" date restricted to before Aug. 19, 2013 (Exhibit J to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).

Printout of Google Search on Jan. 31, 2023 of "Dorotea Mekaniska" date restricted to before Aug. 19, 2013 and before Aug. 18, 2010 (Exhibit B to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Printouts from Nuhn.ca/about/history/ (EX1070 in IPR2023-01161) (May 30, 2024).
Redi-Prime and Venturi Prime, Cornell Pump Co. (2013), <http://www.cornellpump.com/lit/brochure/BR_REDIPRIME.pdf> [https://web.archive.org/web/20150922061133/http://www.cornellpump.com/lit/brochure/BR_REDIPRIME.pdf] (EX1124 in IPR2023-01161).
S. C. Jett et al., Size Distribution and Nutritional Value of Swine Manure Separates, 17(5) Transactions of the ASAE 965 (1974) (EX1097 in IPR2023-01161).
Salehiyon, A. R., S.Minaei, and S. J. Razavi. 2015. Rheological properties of sand-laden dairy manure: modeling by concentration and temperature, AgricEngInt: CIGR Journal, 17(1): 284-292.
Screenshot of Nuhn Vertical Pit Pump Brochure (Nov. 11, 2010).
Screenshots from DSC_0024.AVI (Produced by Alamo Group, Inc. on Jun. 7, 2024 pursuant to subpoena issued by Bazooka in *Nuhn Industries Ltd.* v. *Bazooka Farmstar, LLC*, U.S. District Court for the Southern District of Iowa, Case No. 3:22-cv-00015-SMR-HCA and alleged to predate Jan. 1, 2014).
Screenshots from YouTube of SenwaTec video, retrieved on Jan. 15, 2024 from https://www.youtube.com/watch?v=ecnlfMf7CH4&t=1s.
Screenshots of video allegedly created by UD Umweltdienste, allegedly created on or before May 3, 2012 (Exhibit B to Lonnemann Declaration (EX1013 to IPR2023-01161, IPR2024-00004, and IPR2024-00098); EX1028 to IPR2023-01161; EX1027 to IPR2024-00004; and EX1031 to IPR2024-00098).
SDIA 64—J. Houle & Fils Inc./ Internet Archive Houle Website: Super Pump Prior to Oct. 20, 2007—BAZ000120.
SDIA64-ECF-35; Defendant Bazooka Farmstar, LLC's Motion for Leave to File a First Amended Answer in *Nuhn Industries Ltd.* v. *Bazooka Farmstar, LLC*, U.S. District Court for the Southern District of Iowa, Case No. 3:22-cv-00064-SMR-HCA filed Apr. 14, 2023 (ECF 35, 35-01, 35-02, 35-03);.
SDIA64-ECF-38; Plaintiff Nuhn Industries Ltd.'s Response in Opposition to Defendant Bazooka Farmstar, LLC's Motion for Leave to File a First Amended Answer in *Nuhn Industries Ltd.* v. *Bazooka Farmstar, LLC*, U.S. District Court for the Southern District of Iowa, Case No. 3:22-cv-00064-SMR-HCA filed Apr. 28, 2023 (ECF 38, 38-01);.
SDIA64-ECF-41; Defendant Bazooka Farmstar, LLC's Reply in Support of its Motion for Leave to File a First Amended Answer in *Nuhn Industries Ltd.* v. *Bazooka Farmstar, LLC*, U.S. District Court for the Southern District of Iowa, Case No. 3:22 -; cv-00064-SMR-HCA filed May 5, 2023 (ECF 41);.
SenwaTec Amphi-King Brochure, allegedly created at least as early as Nov. 28, 2012 (Exhibit C to Lonnemann Declaration (EX1013 to IPR2023-01161, IPR2024-00004, and IPR2024-00098); EX1012 to IPR2023-01161, IPR2024-00004, and IPR2024-00098).
SenwaTec-Schroer Umwelt-& Gewassertechnologie Gmbh & Co. KG, Light Amphibious BoatNehicle "Amphi-King®" SWT--AB380 (SenwaTec).
Supplemental Declaration of Eckhard Funck dated Jun. 15, 2024 (English Translation).
Supplemental Declaration of Eckhard Funck dated Jun. 15, 2024 (Original German).
The Beacon Herald, Nuhn Industries Has Global Reach, Nov. 25, 2011.
The Prairie Province's Comm. on Livestock Dev. & Manure Mgmt., Tri-Provincial Manure Application and Use Guidelines: Saskatchewan, Understanding the Soil and Manure Test Reports (2003).
Translation dated Jan. 31, 2024 of Umwelt Dienste Video Screenshots.
Truxor 2009 ENG.pdf, Truxor website, https://web.archive.org/web/20100818031508if_/http://www.doroteamekaniska.se/pdf/truxor%2009%20ENG.pdf, Wayback Machine printout from Aug. 18, 2010 (Exhibit B to Affidavit of Nathaniel E Frank-White, a Records Request Processor at the Internet Archive, executed Dec. 12, 2022, within Exhibit A to Arnoldsson Declaration (EX1007 to IPR2023-

(56) References Cited

OTHER PUBLICATIONS

01161, IPR2024-00004, and IPR2024-00098) and Olofsson Declaration (EX1008 to IPR2023-01161, IPR2024-00004, and IPR2024-00098)).

Truxor 2012 ENG, allegedly available at http://www.aquaclearwatermanagement.com/docs/truxor _ 2012 _ ENG.pdf, allegedly indexed and searchable by a commercial internet search engine prior to Aug. 19, 2013 (Exhibit G to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098); EX1023 to IPR2023-01161; EX1022 to IPR2024-00004; and EX1026 to IPR2024-00098).

Truxor 2013 US inch FloridAquatic, John Farell, allegedly created on Apr. 26, 2013 (Exhibit E to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098); EX1021 to IPR2023-01161; EX1020 to IPR2024-00004; and EX1024 to IPR2024-00098).

Truxor 2013 US inch Hockney, allegedly created on Apr. 26, 2013 (Exhibit F to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098); EX1022 to IPR2023-01161; EX1021 to IPR2024-00004; and EX1025 to IPR2024-00098).

Truxor Amphibian Tool Carrier Brochure, allegedly available for download at least as early as Aug. 18, 2010 (Exhibit D to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098); EX1006 to IPR2023-01161, IPR2024-00004, and IPR2024-00098).

Truxor Amphibian Tool Carrier Brochure, Dorotea Mekaniska AB (Hockney Underwater Weed Cutters, Inc.—Distributor), 20 pages (2015).

Truxor Amphibian Tool Carrier Brochure, Dorotea Mekaniska AB (Megator—Retailer), 20 pages (metadata shows date of Nov. 5, 2013).

Truxor website—broschyrer, https://web.archive.org/web/20100217101718/http://www.doroteamekaniska.se/broschyrer.html, Wayback Machine printout from Feb. 17, 2010 (Exhibit A to Affidavit of Nathaniel E Frank-White, a Records Request Processor at the Internet Archive, executed Dec. 12, 2022, within Exhibit A to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).

Truxor website—index, https://web.archive.org/web/20100216060230/http://www.doroteamekaniska.se/index.html, Wayback Machine printout from Feb. 16, 2010 (Exhibit A to Affidavit of Nathaniel E Frank-White, a Records Request Processor at the Internet Archive, executed Dec. 12, 2022, within Exhibit A to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).

Truxor's Doro Pump Assembly Diagram, allegedly created Sep. 21, 2010 (Exhibit I to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).

Truxor's Doro Pump Instruction Manual, allegedly created on Jan. 27, 2013 (Exhibit H to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).

U.S. Dep't Agric., Agricultural Waste Management System Component Design, in Agricultural Waste Management Field Handbook ch. 10 (2009).

U.S. Dep't Agric., Operation, Maintenance, and Safety, in Agricultural Waste Management Field Handbook ch. 13 (2011).

U.S. Dep't Agric., Waste Utilization, in Agricultural Waste Management Field Handbook ch. 11 (1996).

U.S. Dep't Agric., Agricultural Waste Management Systems, in Agricultural Waste Management Field Handbook ch. 9 (Dec. 2011) (EX2023 to IPR2023-01161).

Voice of Pomerania, They showed a robot for cleaning ponds and lakes (photos, video), Apr. 21, 2012, https://gp24.pVpokazali-robota-do-czyszczenia-stawow-ijezior-zdjecia-wideo/ar/4773731 (Exhibit C to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).

William F. Wright, Dairy Manure Particle Size Distribution, Properties, and Implications for Manure Handling and Treatment, in 2005 ASAE Ann. Int'l Meeting (2005).

William L. Kranz et al., Application of Liquid Animal Manures Using Center Pivot Irrigation Systems, U. Neb. Extension (May 10, 2007) (EX1102 in IPR2023-01161).

TRUX0000001—Photograph of Truxor DM 5000 (metadata shows last modified date of Aug. 19, 2009) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015- SMR-HCA).

TRUX0000002—Photograph of Truxor (metadata shows date taken of Apr. 13, 2007) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000003—Photograph of Truxor DM 5000 (metadata shows date taken of May 29, 2009) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000004—Photograph of Truxor DM 5000 (metadata shows date taken of May 29, 2009) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000005—Photograph of a hose (metadata shows date taken of May 30, 2009) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000006—Photograph of a Truxor DM 5000 and a hose (metadata shows date taken of May 30, 2009) (Produced by third-party Truxor on Sep. 4, 2024 in *Nuhn Industries Ltd.* v. *Bazooka Farmstar, LLC*, U.S. District Court for the Southern District of Iowa, Case No. 3:22- cv-00015-SMR-HCA).

TRUX0000007—Photograph of a hose (metadata shows date taken of May 30, 2009) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000009-28—Truxor T-Series Brochure (metadata shows create date of Jan. 11, 2022) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000030—Photograph of Truxor (metadata shows last modified date of Nov. 22, 2005) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000031-82—Truxor DM 5000 Manual (metadata shows create date of Nov. 23, 2009) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000242—Photograph of Truxor DM 5000 (metadata shows date taken of Sep. 16, 2011) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000243—Photograph of Truxor DM 5000 (metadata shows date taken of Sep. 16, 2011) (Produced by third-party Truxor on

(56) References Cited

OTHER PUBLICATIONS

Sep. 4, 2024 in *Nuhn Industries Ltd.* v. *Bazooka Farmstar, LLC*, U.S. District Court for the Southern District of Iowa, Case No. 3:22-cv-00015- SMR-HCA).

TRUX0000248-254—Praktik for Mudderpump 2500 (metadata shows created date of May 11, 2009) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA) (with machine translation).

TRUX0000255—Email allegedly related to remote control for Truxor (allegedly dated Dec. 16, 2010) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA) (with machine translation).

TRUX0000256-257—Scanreco Remote Control—Control Unit Maxi (metadata shows created date of Apr. 6, 2010) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

TRUX0000258—Email allegedly related to remote control for Truxor (allegedly dated Mar. 29, 2011) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA) (with machine translation).

BAZ15_0024319-336—SenwaTec Spare Parts List (metadata shows created date of Oct. 8, 2013) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA).

BAZ15_0024347-379—Manual Amphi-King SWT-AB380 (metadata shows created date of Apr. 25, 2014) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA).

BAZ15_0024380-412—Manual Amphi-King SWT-AB380 (metadata shows created date of Sep. 25, 2013) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA).

BAZ15_0024737-738—Berky Machine Program brochure (metadata shows created date of Mar. 31, 2003) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA).

BAZ15_0024739-740—Berky Sludge-Pump Type 5980 brochure (Nov. 2001) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA).

BAZ15_0024741-742—Berky Amphibian Boat Type 6450 brochure (Jan. 2002) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA).

BAZ15_0024745-760—Berky Company Brochure (metadata shows created date of Jun. 9, 2004) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA).

BAZ15_0025046-90—Berky Amphibious Mower and Clearing Boat Type 6460 Maintenance and Operating Instructions—Spare Parts List / from Dec. 2006 (metadata shows created date of Aug. 8, 2006) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA) (with machine translation).

Phil's Pumping and Fabrication—Our Products (Sep. 30, 2015), http://www.philspumpingandfab.com/prod_lag_pumps.php (https://web.archive.org/web/20150930223114/http://www.philspumpingandfab.com/prod_lag_pumps.php).

Annex Publishing & Printing Inc., Manure Manager, Mar./Apr. 2009.

Annex Publishing & Printing Inc., Manure Manager, May/Jun. 2012.

Annex Publishing & Printing Inc., Manure Manager, Jul./Aug. 2012.

Annex Publishing & Printing Inc., Manure Manager, Jan./Feb. 2013.

DE19527977 Translation (Apr. 3, 2021).

TRUX0000125-238—Spare Parts List for Truxor DM 5000 Manual (metadata shows created date of Mar. 29, 2011) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA)—Part 1.

TRUX0000125-238—Spare Parts List for Truxor DM 5000 Manual (metadata shows created date of Mar. 29, 2011) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA)—Part 2.

TRUX0000125-238—Spare Parts List for Truxor DM 5000 Manual (metadata shows created date of Mar. 29, 2011) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA)—Part 3.

TRUX0000259—Screenshots of Video of Truxor DM 5000 (video allegedly taken in 2011) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

BAZ15_0025091-150—Berky Amphibious Mower and Clearing Boat Type 6460 Maintenance and Operating Instructions—Spare Parts List / from Dec. 2005 (metadata shows created date of Jun. 14, 2006) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA) (with machine translation)—Part 1.

BAZ15_0025091-150—Berky Amphibious Mower and Clearing Boat Type 6460 Maintenance and Operating Instructions—Spare Parts List / from Dec. 2005 (metadata shows created date of Jun. 14, 2006) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA) (with machine translation)—Part 2.

BAZ15_0025151-195—Berky Amphibious Mower and Clearing Boat Type 6470 Maintenance and Operating Instructions—Spare Parts List / from Dec. 2006 (metadata shows created date of Sep. 26, 2006) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA)—Part 1.

BAZ15_0025151-195—Berky Amphibious Mower and Clearing Boat Type 6470 Maintenance and Operating Instructions—Spare Parts List / from Dec. 2006 (metadata shows created date of Sep. 26, 2006) (Custodian Berky GmbH, produced by Bazooka on Mar. 14, 2024 in *Nuhn Industries Ltd.* v. *Bazooka Farmstar, LLC*, U.S. District Court for the Southern District of Iowa, Case No. 3:22-cv-00015-SMR-HCA)—Part 2.

TRUX0000008—Photograph of a hose in water (metadata shows date taken of May 30, 2009) (Produced by third-party Truxor on Sep. 4, 2024 in *Nuhn Industries Ltd.* v. *Bazooka Farmstar, LLC*, U.S. District Court for the Southern District of Iowa, Case No. 3:22-cv-00015-SMR-HCA).

EX1065—Part 651 Agricultural Waste Management Field Handbook. Chapter 11. Waste Utilization. United States Department of Agriculture, Natural Resources Conservation Service. 1992.

Declaration of Benny D. Puck, Dated Jul. 31, 2024 (EX1114 in IPR2023-01161).

Screenshots from Puck Enters., Inc., Puck Agitation Boat, 2012, Youtube, (Sep. 19, 2012), https://youtu.be/1fRPrwGUyM0 (EX1119 in IPR2023-01161).

(56)         References Cited

OTHER PUBLICATIONS

Screenshots of Puck Agitation Boat—Jeremy Puck posted to YouTube at https://www.youtube.com/watch?v=1MqPldkqOq4 (YouTube lists date of Aug. 10, 2011) https://www.youtube.com/watch?v=1MqPldkqOq4.

Declaration of Benny D. Puck, Dated Aug. 28, 2024 (EX1121 in IPR2024-00004).

Screenshots of EX1123 in IPR2024-00004—Puck Enterprises, Inc., Puck Lagoon Agitation Boat and MobileStar Pump Control, Youtube (Dec. 28, 2011), https://www.youtube.com/watch?v=cMplzZ6IRYE (referred to as "Exhibit B" in EX1121).

Screenshots of EX1125 in IPR2024-00004—Puck Enterprises, Inc., Puck Agitation Boat—Ben Puck, Youtube (Jul. 29, 2011), https://www.youtube.com/watch?v=gfNO0bi0uk0 (referred to as "Exhibit D" in EX1121).

Screenshots of EX1126 in IPR2024-00004—Puck Enterprises, Inc., Puck Agitation Boat—Front Cannon Aug. 30, 2011, Youtube (Sept. 9, 2011), https://www.youtube.com/watch?v=4whiyZZ9N3s (referred to as "Exhibit E" in EX1121).

Puck0000045, 46, 47, 55, 56—Photographs Produced by Puck Custom Enterprises (metadata shows image taken dates of Sep. 16, 2006, Sep. 27, 2006, and Oct. 25, 2006) (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA).

Puck0000004, 43, 44, 53—Photographs Produced by Puck Custom Enterprises (metadata shows image taken dates of Nov. 1, 2010 and Nov. 2, 2010) (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA).

PUCK0000100-112—Photographs Produced by Puck Custom Enterprises (metadata shows image taken date of Jan. 17, 2011) (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA).

Puck0000001, 2, 3, 36-42, 50, 51, 113-121—Photographs Produced by Puck Custom Enterprises (metadata shows image taken date of Jan. 21, 2011) (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA).

Puck0000048, 58, 122-124, 126—Photographs Produced by Puck Custom Enterprises (metadata shows image taken date of Mar. 21, 2011, Apr. 6, 2011, and Apr. 16, 2011) (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA).

Puck0000060-62, 65-68, 129-139—Photographs Produced by Puck Custom Enterprises (metadata shows image taken date of Mar. 7, 2013) (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA)—Part 1.

Puck0000063, 64, 69-76, 140-147—Photographs Produced by Puck Custom Enterprises (metadata shows image taken date of Mar. 7, 2013) (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA)—Part 2.

PUCK0000077—Puck Agitation Boat Operators Manual 2011 (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA).

PUCK0000098—Puck Agitation Boats Brochure (metadata shows image taken date of Sep. 27, 2013) (Produced by third-party Puck Custom Enterprises on Nov. 13, 2024 in *Nuhn Industries Ltd.* v.

*Bazooka Farmstar, LLC*, U.S. District Court for the Southern District of Iowa, Case No. 3:22-cv-00015-SMR-HCA).

PUCK0000005—Puck Agitation Boat Operators Manual (last revision date of Aug. 10, 2022) (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA).

Screenshots of PUCK0000054—Boat4010_MVI_5313.MOV (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA).

Screenshots of PUCK0000057—MVI_8629.MOV (Produced by third-party Puck Custom Enterprises on Nov. 13, 2024 in *Nuhn Industries Ltd.* v. *Bazooka Farmstar, LLC*, U.S. District Court for the Southern District of Iowa, Case No. 3:22-cv-00015-SMR-HCA).

Declaration of Ernie Sundstrom, Dated Aug. 1, 2024 (EX1115 in IPR2023-01161).

Screenshots of Sundstrom Pit Pumping Stir Boat posted to YouTube at https://www.youtube.com/watch?v=tTtFx1AUQi0 (YouTube lists date of Mar. 12, 2013).

Screenshots of Sundstrom Stir Dredge posted to YouTube at https://www.youtube.com/watch?v=RDyAyLgMETY (YouTube lists date of Apr. 13, 2012).

Sundstrom's Pit Pumping, LLC., http://www.sundstrompitpumping.com/ (last visited Oct. 1, 2024) (EX1156 in IPR2024-00004).

Office Action mailed on Apr. 17, 2025 in the Reexamination of U.S. Pat. No. 11,448,224 (Reexam U.S. Appl. No. 90/019,482).

Request for Ex Parte Reexamination dated Apr. 15, 2024 on U.S. Appl. No. 11/448,224.

Request for Ex Parte Reexamination dated Apr. 15, 2024 on U.S. Appl. No. 11/448,224—Exhibit 1001.

Request for Ex Parte Reexamination dated Apr. 15, 2024 on U.S. Appl. No. 11/448,224—Exhibit 1002.

Request for Ex Parte Reexamination dated Apr. 15, 2024 on U.S. Appl. No. 11/448,224—Exhibit 1003.

Request for Ex Parte Reexamination dated Apr. 15, 2024 on U.S. Appl. No. 11/448,224—Exhibit 1004—Part 1.

Request for Ex Parte Reexamination dated Apr. 15, 2024 on U.S. Appl. No. 11/448,224—Exhibit 1004—Part 2.

Request for Ex Parte Reexamination dated Apr. 15, 2024 on U.S. Appl. No. 11/448,224—Exhibit 1005.

Request for Ex Parte Reexamination dated Apr. 15, 2024 on U.S. Appl. No. 11/448,224—Exhibit 1006.

Request for Ex Parte Reexamination dated Apr. 15, 2024 on U.S. Appl. No. 11/448,224—Exhibit 1007.

Request for Ex Parte Reexamination dated Apr. 15, 2024 on U.S. Appl. No. 11/448,224—Exhibit 1008.

Request for Ex Parte Reexamination dated Apr. 15, 2024 on U.S. Appl. No. 11/448,224—Exhibit 1009.

Request for Ex Parte Reexamination dated Apr. 15, 2024 on U.S. Appl. No. 11/448,224—Exhibit 1010.

Request for Ex Parte Reexamination dated Apr. 15, 2024 on U.S. Appl. No. 11/448,224—Exhibit 1011.

Request for Ex Parte Reexamination dated Apr. 15, 2024 on U.S. Appl. No. 11/448,224—Exhibit 1012.

Request for Ex Parte Reexamination dated Apr. 15, 2024 on U.S. Appl. No. 11/448,224—Exhibit 1013.

Request for Ex Parte Reexamination dated Apr. 15, 2024 on U.S. Appl. No. 11/448,224—Exhibit 1014.

Request for Ex Parte Reexamination dated Apr. 15, 2024 on U.S. Appl. No. 11/448,224—Exhibit 1015.

Request for Ex Parte Reexamination dated Apr. 15, 2024 on U.S. Appl. No. 11/448,224—Exhibit 1016.

Request for Ex Parte Reexamination dated Apr. 15, 2024 on U.S. Appl. No. 11/448,224—Exhibit 1017.

Request for Ex Parte Reexamination dated Apr. 15, 2024 on U.S. Appl. No. 11/448,224—Exhibit 1018.

Request for Ex Parte Reexamination dated Apr. 15, 2024 on U.S. Appl. No. 11/448,224—Exhibit 1019.

Request for Ex Parte Reexamination dated Apr. 15, 2024 on U.S. Appl. No. 11/448,224—Exhibit 1020.

(56)                    References Cited

OTHER PUBLICATIONS

Request for Ex Parte Reexamination dated Apr. 15, 2024 on U.S. Appl. No. 11/448,224—Exhibit 1021.
Request for Ex Parte Reexamination dated Apr. 15, 2024 on U.S. Appl. No. 11/448,224—Exhibit 1022.
Request for Ex Parte Reexamination dated Apr. 15, 2024 on U.S. Appl. No. 11/448,224—Exhibit 1023.
Request for Ex Parte Reexamination dated Apr. 15, 2024 on U.S. Appl. No. 11/448,224—Exhibit 1024.
Request for Ex Parte Reexamination dated Apr. 15, 2024 on U.S. Appl. No. 11/448,224—Exhibit 1025.
Request for Ex Parte Reexamination dated Apr. 15, 2024 on U.S. Appl. No. 11/448,224—Exhibit 1026.
Request for Ex Parte Reexamination dated Apr. 15, 2024 on U.S. Appl. No. 11/448,224—Exhibit 1027.
Espacenet Machine Translation of Claims of DE3711015A1, https://translationportal.epo.org/emtp/translate?ACTION=claims-retrieval &COUNTRY=DE&ENGINE=google&FORMAT=docdb&KIND= A1&LOCALE=en_EP&NUMBER=3711015&SRCLANG=de &TRGLANG=en&apikey=TSMqTfrVAvNtryGI8Qlfbozj8DnAGlqJ &PDF=GqZCeodBuRsTWEDTCxKeMI-LKeuutm3O--1Ou- uV5TPej7yEWMwxGuOdVR0OjyGECpbSfIMxmK1oqCGe0z7ZsQ (Jun. 16, 2025).
Espacenet Machine Translation of Description of DE3711015A1, https://translationportal.epo.org/emtp/translate/?ACTION=description- retrieval&COUNTRY=DE&ENGINE=google&FORMAT=docdb &KIND=A1&LOCALE=en_EP&NUMBER=3711015&SRCLANG= de&TRGLANG=en (Jun. 16, 2025).
Calumet Hi-Volume Pit Pump Brochure (document undated).
Calumet Hi-Volume Pit Pump Operator's Manual (allegedly dated Nov. 1994).
Office action dated Dec. 17, 2024 on U.S. Appl. No. 90/019,482, stemming from an Ex Parte reexamination dated Apr. 15, 2024 on U.S. Pat. No. 11,448,224.

* cited by examiner

1

PUMP FOR IMMERSION WITHIN A FLUID RESERVOIR

CROSS-REFERENCE TO RELATED APPLICATIONS

This application is a continuation of U.S. patent application Ser. No. 18/472,696 filed Sep. 22, 2023, which is a continuation of U.S. patent application Ser. No. 18/120,034 filed Mar. 10, 2023, which is a continuation of U.S. patent application Ser. No. 17/886,031 filed Aug. 11, 2022, which is a continuation of U.S. patent application Ser. No. 17/743, 610 filed May 13, 2022 now issued under U.S. Pat. No. 11,448,224 on Sep. 20, 2022, which is a continuation of U.S. patent application Ser. No. 17/021,323, filed Sep. 15, 2020 now abandoned, which is a continuation of U.S. patent application Ser. No. 16/053,331, filed Aug. 2, 2018, now issued under U.S. Pat. No. 10,808,707 on Oct. 20, 2020, which is a continuation of U.S. patent application Ser. No. 15/063,566, filed Mar. 8, 2016, now issued under U.S. Pat. No. 10,066,629 on Sep. 4, 2018, which is a continuation of U.S. patent application Ser. No. 14/570,504, filed Dec. 15, 2014, now issued under U.S. Pat. No. 9,488,190 on Nov. 8, 2016, which is a continuation of U.S. patent application Ser. No. 13/038,189 filed Mar. 1, 2011, now issued under U.S. Pat. No. 8,944,758 on Feb. 3, 2015, the contents of all of which are incorporated herein by reference.

FIELD OF THE INVENTION

The invention relates to pumps, particularly pumps that are positionable alongside a fluid reservoir for immersion within the reservoir. In particular, the invention relates to agricultural pumps for the pumping of liquid manure from liquid manure reservoirs.

BACKGROUND

Liquid manure from animal husbandry operations, particularly pig farming operations, is typically stored in a large manure reservoir or lagoon until there is a sufficient quantity available to spread or irrigate onto farm land for disposal. In order to remove the manure from the reservoir, a pump is used that is typically located alongside the reservoir and lowered into the reservoir. The pump can be free standing or attached to a tractor, which is often preferable to provide stability to the pump and a source of motive power for the pump.

The volumetric flow rate of fluid handled by the pump is large, typically in excess of 4000 gal/min; accordingly, it is desirable that the pump be efficient in terms of providing the required flow with minimal energy loss. Efficient pumps permit use of smaller tractors for providing motive power and reduce the fuel consumption of the tractor, reducing pump operating cost. In addition, it is desirable that the pump have large fluid openings and generous tolerances in order that solid material in the reservoir can be accommodated by the pump without plugging; this works against pump efficiency and makes it extra important to capitalize on efficiency gains wherever else they might be available.

Since the surface of the reservoir is variable in height relative to the side, due to either variation in the degree to which the reservoir is filled or due to removal of manure from the reservoir by pumping, it is desirable to have a pump with a variable depth position and optionally orientation relative to the surface. This is commonly accomplished by lowering the entire pump towards the surface, which often requires the tractor to be positioned dangerously close to the edge of the reservoir and is not suitable for all situations, particularly lagoons with gradually sloped sides or reservoirs with elevated sides.

In addition, it is desirable to have some means of surface agitation, either separate from the pump or incorporated into the pump itself, to disrupt formation of a cake or blanket on the surface of the reservoir and/or to prevent foam formation during pumping. The means of agitation often comprises a nozzle for re-directing a portion of the pumped fluid back to the surface of the reservoir; however, these nozzles are typically fixed and lack the ability to be positioned to break up cakes and foam.

Accordingly, there still exists a need for improved pumps, particularly pumps that are positionable alongside a fluid reservoir for immersion within the reservoir.

SUMMARY OF THE INVENTION

According to an aspect of the invention, there is provided a pump for immersion within a fluid reservoir comprising: a pump body comprising an elongated fluid conduit; a housing located at a bottom end of the pump body, the housing comprising a fluid inlet and at least two upwardly oriented tangential fluid outlets located on opposite sides of the body; a combiner for creating a fluid connection between the outlets and the fluid conduit; an impeller located within the housing having vanes shaped to direct the fluid tangentially within the housing.

The pump desirably further comprises a frame that may be adapted for mounting to a farm vehicle, particularly a tractor. The frame may comprise means for mounting to a three point hitch connection of a tractor, a type of connection that is well known in agriculture and permits a frame to be raised or lowered relative to the tractor. The pump body may be pivotable about at least a portion of the frame from a substantially horizontal transport position to a non-horizontal (e.g. vertical) working position. The pump may further comprise a frame adjustment means for adjusting an angular relationship between the pump body and horizontal. This allows the pump to be presented to the reservoir surface with a variety of angular orientations.

The pump body and fluid conduit may be extensible along a longitudinal axis of the pump in order to vary a length of the pump. This permits further flexibility in terms of pump position relative to the reservoir surface and allows the pump housing to be extended downwardly towards the surface as the reservoir is emptied. The pump may comprise a drive means for delivering motive power from a motive power source (such as an engine located, for example, on the tractor), to the impeller of the pump. The drive means may be adapted for adjustment with the pump body along the longitudinal axis. The drive means may comprise a hydraulic fluid conduit for providing hydraulic fluid power to a hydraulic motor connected to the impeller or, preferably, a Power Take-Off (PTO) shaft that is extensible with the pump body and fluid conduit. The pump body, fluid conduit, and drive means may comprise telescoping connections to permit variation in length.

The housing desirably improves efficiency of the pump by directing the fluid not just tangentially of the housing, but also upwardly. This eliminates the need for elbows to direct the fluid upwardly, which lead to pressure drop and efficiency loss. The outlets desirably direct the fluid upwardly from the housing at an angle of from 20 to 70 degrees relative to a plane of rotation of the impeller, more desirably at an angle of from 30 to 60 degrees, yet more desirably at an angle of from 40 to 50 degrees. The at least two outlets may comprise at least three outlets or at least four outlets. The at least two outlets may comprise, two outlets, three outlets or four outlets. The outlets may be evenly spaced about the circumference of the housing.

In order to impart the desired direction to the fluid as it leaves the housing and to reduce the amount of energy robbing directional change required, it is desirable that the vanes of the impeller are configured to direct the fluid both tangentially and upwardly, relative to the plane of rotation of the impeller, within the housing. This can be accomplished by providing the vanes with a curved side profile, such that rotation of the impeller causes the fluid to follow the curvature of the vane and directs the fluid tangentially to the direction of rotation and upwardly along the vane. This desirably causes the fluid to exit through the outlets in a direction substantially parallel to the outlets, reducing the need for directional change to be imparted to the fluid by the housing and thereby increasing the efficiency of the pump. In addition, use of multiple outlets reduces the pressure drop experienced by the fluid as it exits the pump, further improving pump efficiency and reducing the likelihood of blockage of the outlet due to any solid debris that may be present in the fluid being pumped.

The pump is desirably equipped with a bottom inlet located substantially in the center of the impeller. Although multiple inlet openings may be used, it is desirable that a singled inlet opening is used with a large enough diameter to permit debris to pass through the pump without plugging the inlet. The inlet diameter is desirably at least one third of the diameter of the pump housing, more desirably at least half of the diameter of the pump housing. By locating the inlet in the bottom of the housing, a relative shallower amount of fluid is required for pumping, permitting more complete drainage of the reservoir being pumped.

The combiner desirably directs fluid from the outlets upwardly along the body and towards a bottom end of the fluid conduit. The combiner desirably uses gradual bends to reduce the likelihood of pressure loss of the fluid, thereby improving overall pump efficiency. The combiner is desirably located between the housing and the bottom end of the fluid conduit, but can also be located elsewhere, for example near a top of the pump. In this case, it is desirable that flexible fluid conduits are employed in order to accommodate length variation of the pump body.

The pump may further comprise an agitator nozzle for directing a portion of the fluid passing through the pump outwardly from the pump and back towards a surface of the fluid reservoir. This desirably permits disruption of cake, blanket or foam formation on the surface of the reservoir. The agitator nozzle is desirably in fluid communication with the fluid conduit. The agitator nozzle may be connected to the fluid conduit by a rotatable nozzle body that permits rotation of the nozzle about the longitudinal axis. The pump may further comprise a nozzle orientation means for adjusting an angular relationship between the longitudinal axis and the nozzle. The nozzle orientation means may be mounted to the rotatable nozzle body. By permitting rotation and angular adjustment relative to the longitudinal axis, fluid exiting the nozzle can be directed towards any desired location on the surface of the reservoir, simplifying the task of disrupting cakes, blankets or foam on the surface. A flexible connection may be provided between the nozzle and the rotatable nozzle body.

According to another aspect of the invention, there is provided a pump for immersion within a fluid reservoir, the pump comprising: a frame; a telescoping pump body connected to the frame, the body comprising a telescoping fluid conduit, the body and conduit extensible along a longitudinal axis; a frame adjustment means for pivoting the telescoping pump body from a substantially horizontal transport position to a non-horizontal working position; a housing located at a bottom of the pump body comprising a bottom fluid inlet and at least two upwardly oriented tangential fluid outlets located on opposite sides of the body; a combiner for creating a fluid connection between the outlets and the telescoping fluid conduit, the combiner directing fluid from the outlets upwardly along the body and towards a bottom end of the fluid conduit; an impeller located within the housing having vanes shaped to direct the fluid tangentially and upwardly within the housing; a drive means for providing power to the impeller, the drive means extensible with the telescoping pump body; an agitator nozzle for directing a portion of the fluid outwardly from the pump back to a surface of the fluid reservoir, the agitator nozzle rotatable about the longitudinal axis; and, a nozzle orientation means for adjusting an exit trajectory of the nozzle.

According to yet another aspect of the present invention, there is provided a pump comprising an elongated fluid conduit aligned with a longitudinal axis of the pump; a housing at a bottom of the conduit containing an impeller for directing fluid through the conduit; an agitator nozzle in fluid communication with the conduit; and, a nozzle orientation means for adjusting an exit trajectory of the nozzle.

Although described herein with reference to the pumping of liquid manure, the pump according to the present invention can be employed in any fluid pumping situation, particularly where reservoirs with variable height are encountered, such as when pumping fluid from rivers, ponds, lakes, rain water storage reservoirs, etc.

BRIEF DESCRIPTION OF THE DRAWINGS

Having summarized the invention, preferred embodiments thereof will now be described with reference to the accompanying figures, in which:

FIG. 4b shows a sectional view of the pump housing of FIG. 4a;

DETAILED DESCRIPTION

Figure 1:
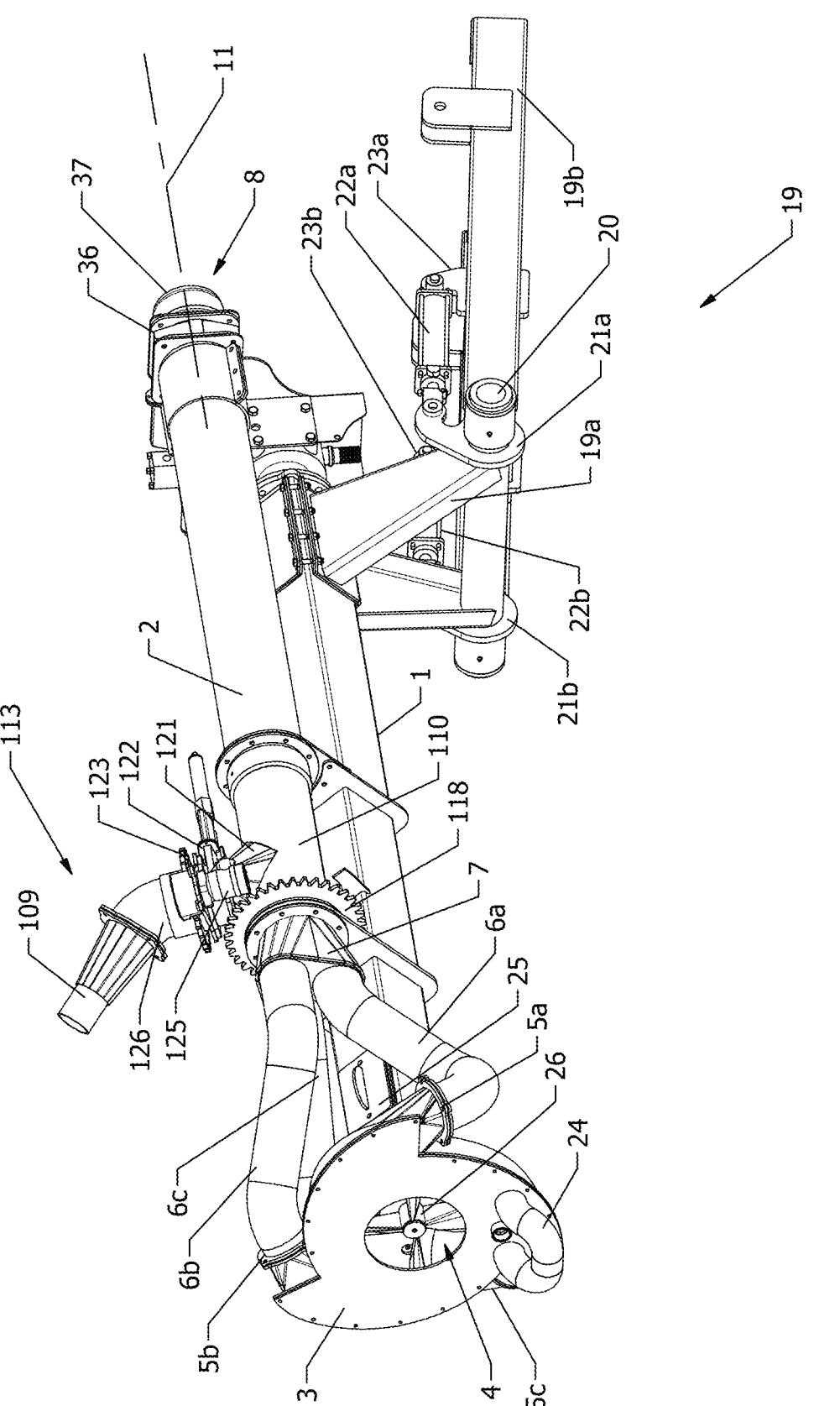
FIG. 1 shows a perspective view of a pump according to the invention in a transport position.

Referring to FIG. 1, an embodiment of a pump according to the present invention is shown comprising a pump body 1 and an elongated fluid conduit 2 with a centrally located longitudinal axis 11. A pump housing 3 is mounted to a bottom end of the pump body and comprises a fluid inlet 4 located on a bottom thereof and three upwardly oriented tangential fluid outlets 5a, 5b, 5c evenly spaced about the circumference of the housing 3 for directing fluid upwardly along the body 1. The outlets 5a, 5b, 5c are connected to outlet conduits 6a, 6b, 6c that are in turn connected to a fluid combiner 7. The combiner 7 directs the flow from the outlet conduits 6a, 6b into the elongated fluid conduit 2, where it moves upwardly towards the conduit outlet 8. A flow control valve 36, comprising a hydraulically actuated gate valve, is flange mounted at the outlet 8. Fluid exiting the outlet 8 can be delivered to rigid or flexible conduit, depending on what is best suited to the application, attached to the pump via outlet connector 37.

Figure 6:
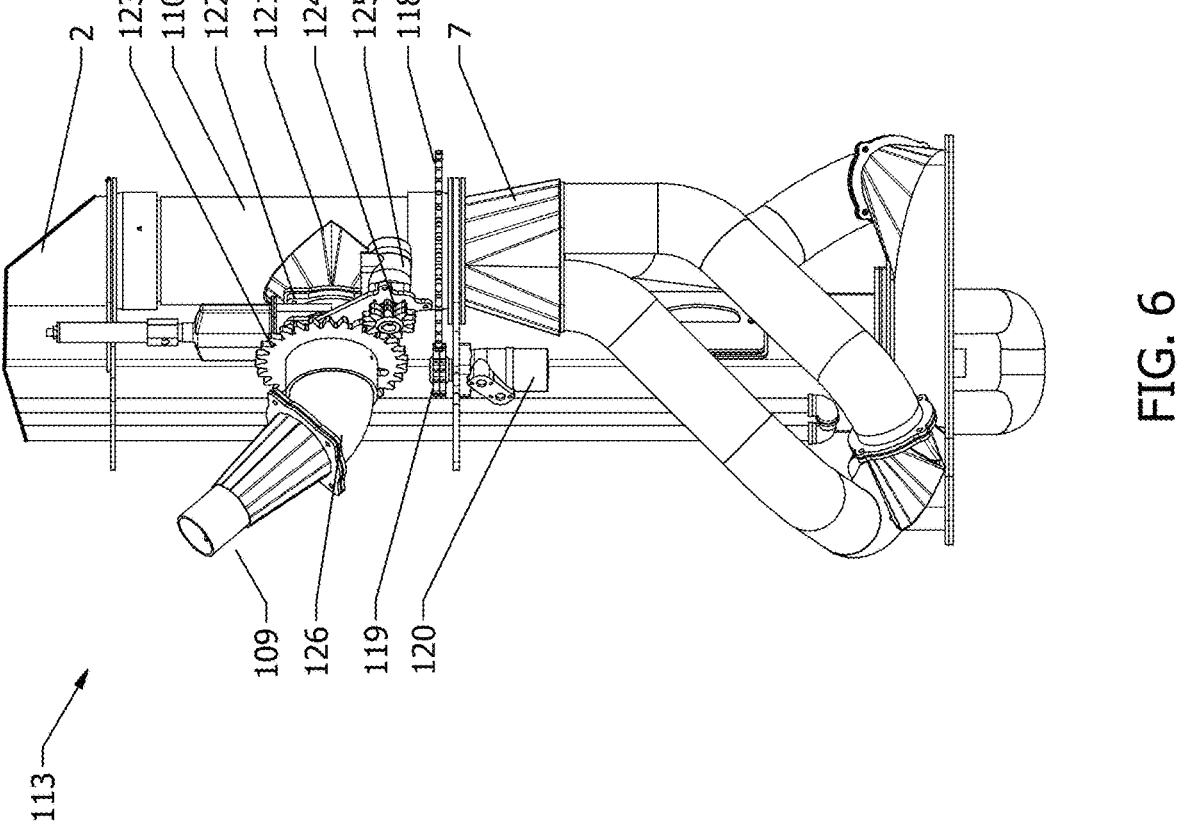
FIG. 6 shows an embodiment of a nozzle orientation means according to the invention in a first position.
Figure 7:
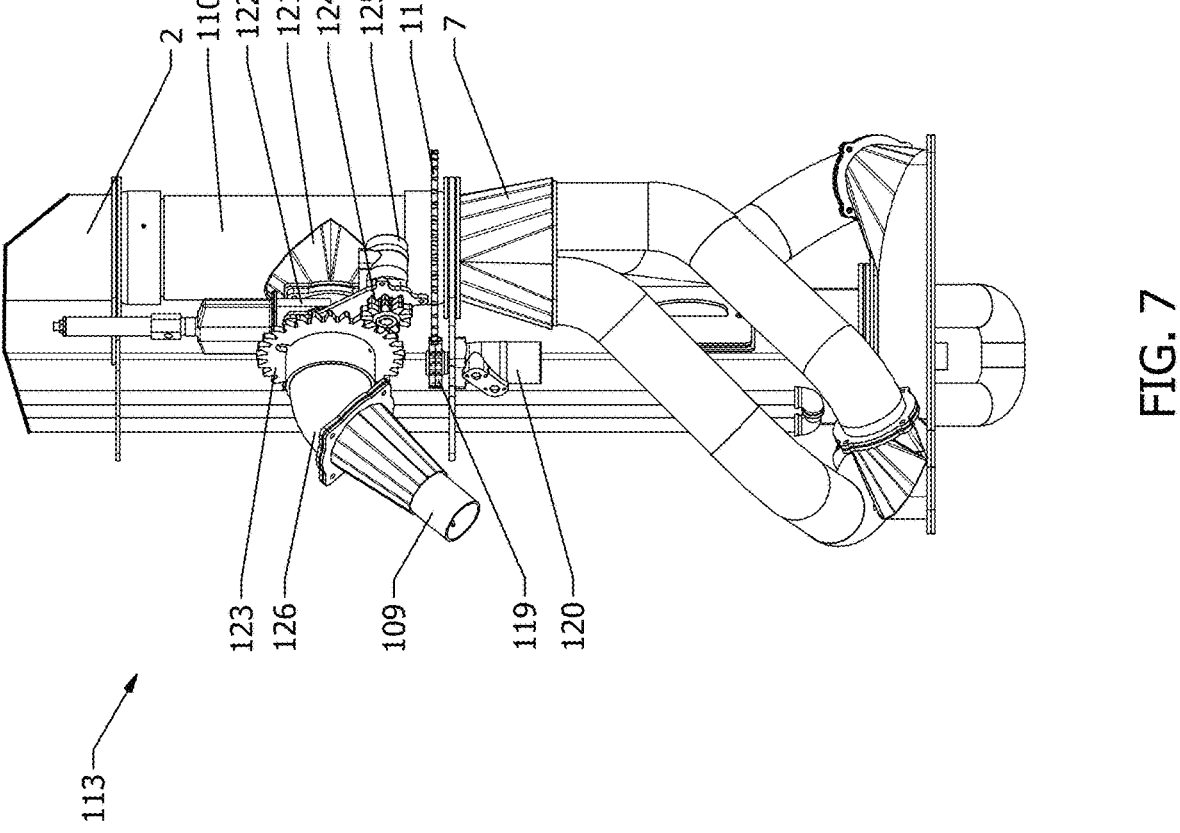
FIG. 7 shows the nozzle orientation means of FIG. 6 in a second position.
Figure 8:
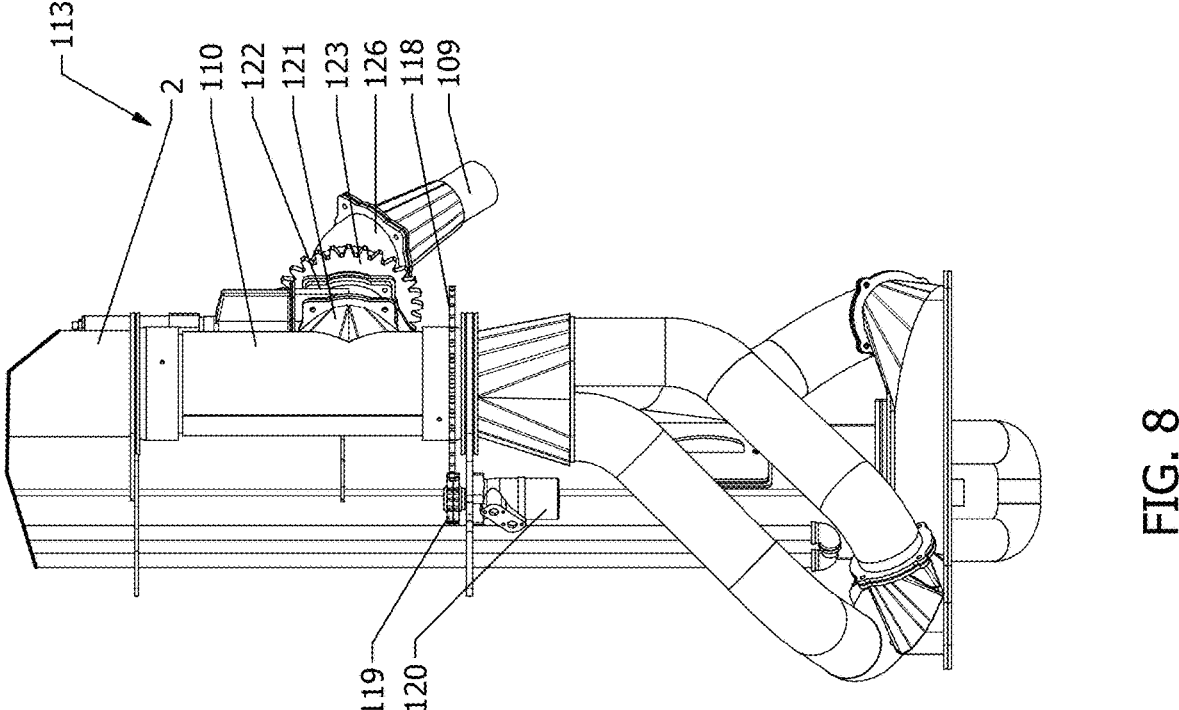
FIG. 8 shows the nozzle orientation means of FIG. 6 in a third position.

Turning additionally to FIGS. 6 through 8, the fluid conduit 2 comprises a nozzle body 110 that is connected to an agitator nozzle 109, both of which are movable via a nozzle orientation means 113. The nozzle body 110 comprises a section of the fluid conduit 2 that is rotatable about a longitudinal axis 11 by way of engagement between a nozzle sun gear 118 and a nozzle moon gear 119 that is actuated by a hydraulic motor 120. Suitable seals, such as O-rings, are provided to maintain a fluid seal between the combiner 7 and the upper portion of the fluid conduit 2, despite the rotational movement of the nozzle body 110. The nozzle body 110 comprises a T-shaped portion 121 to which a nozzle gate valve 122 is flange mounted. The nozzle gate valve 122 is hydraulically actuated and can be adjusted in order to provide a means for controlling the fluid flow rate through the nozzle 109. A second sun gear 123 is engaged with a second moon gear 124 that is actuated by a second hydraulic motor 125. Rotation of the motor 125 causes the nozzle 109 to rotate about an axis perpendicular to the longitudinal axis 11. The nozzle 109 is equipped with a fixed 45° elbow 126. By selecting a desired combination of rotation of the nozzle sun gear 118 and the second sun gear 123, a wide range of fluid exit trajectories can be obtained from the nozzle 109. A number of potential trajectories are illustrated with reference to FIGS. 6-8. This allows a stream of the fluid being pumped to exit the pump and be re-directed back to the surface of the fluid reservoir in order to provide agitation and to break-up any solid clumps of debris or foam that may have accumulated at the surface.

Figure 2:
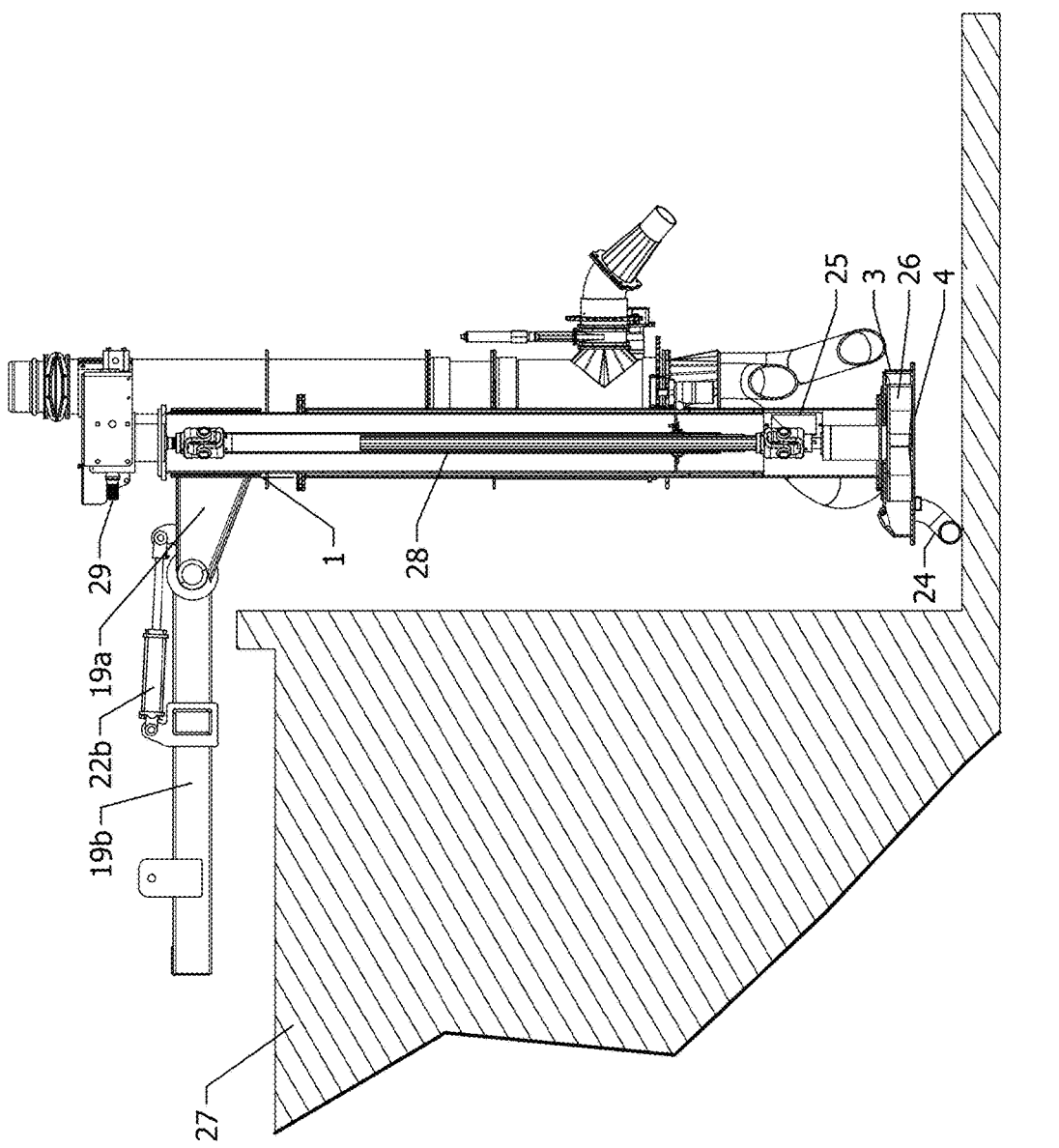
FIG. 2 shows a right side cut-away view of the pump of FIG. 1 in a working position.
Figure 3A:
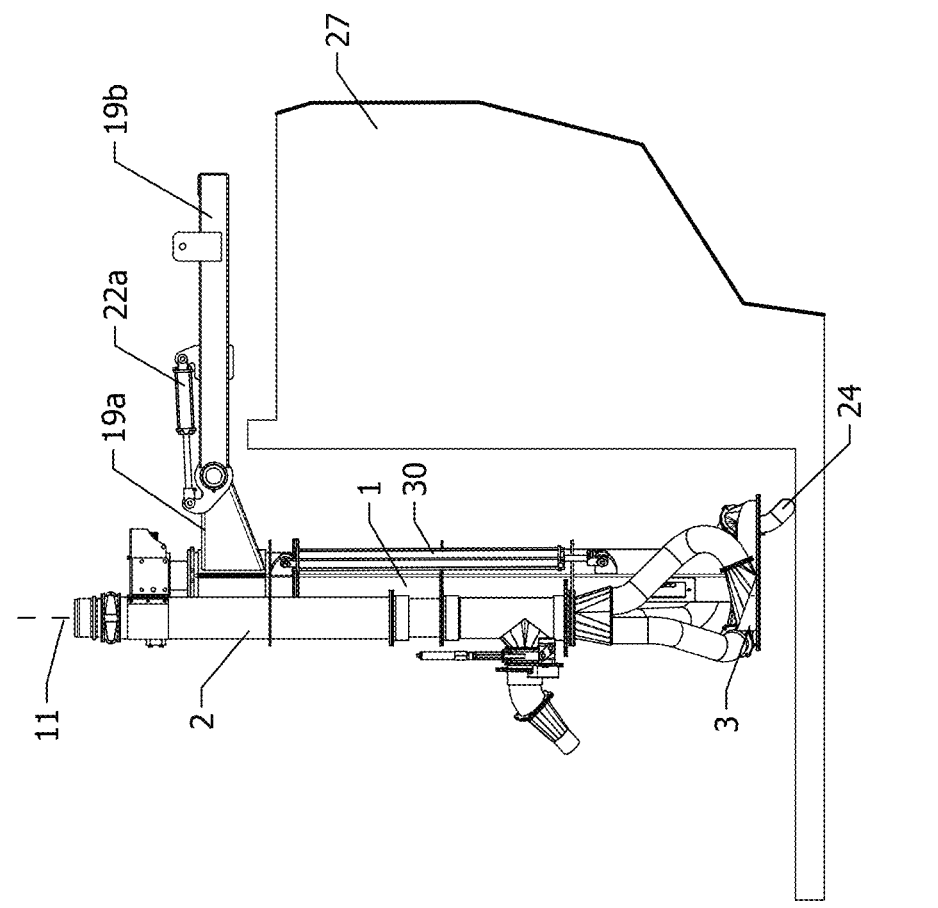
FIG. 3a shows a left side cut-away view of the pump of FIG. 1 in a working position.
Figure 3B:
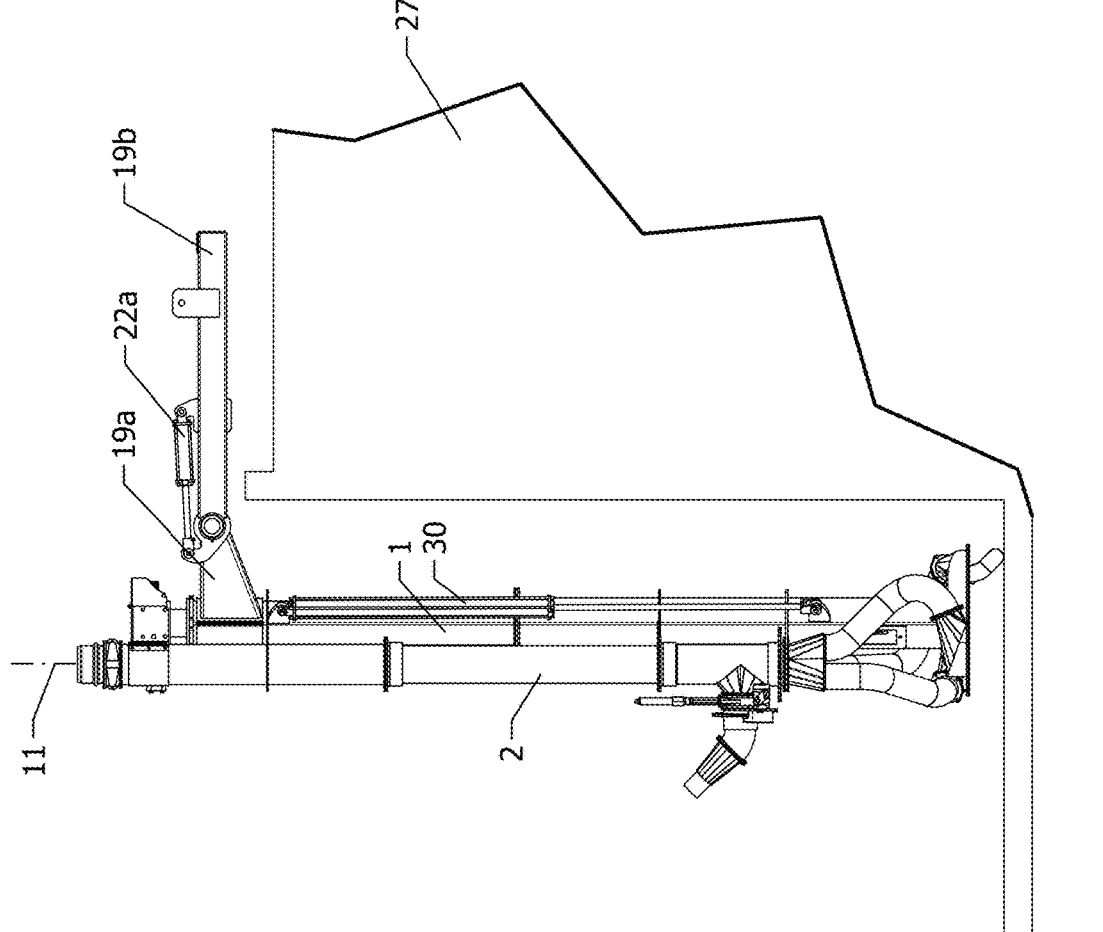
FIG. 3b shows a left side cut-away view of the pump of FIG. 1 in an extended working position.

Returning now to FIG. 1, the pump further comprises a frame 19 that comprises a first portion 19a pivotally connected to a second portion 19b via a frame pivot shaft 20. The first portion 19a is attached to the pump body 1. A frame adjustment means is provided for adjusting an angular relationship of the pump body relative to horizontal. The frame adjustment means comprises a pair of frame dogs 21a, 21b that are attached to the first frame portion 19a proximal the pivot shaft 20. The frame dogs 21a, 21b are interconnected with a pair of pivot cylinders 22a, 22b mounted to pivot lugs 23a, 23b of the second portion 19b. Actuation of the cylinders 22a, 22b causes the first portion 19a to rotate about the pivot shaft 20 relative to the second portion 19b in order to change the angular orientation of the pump body 1 from a substantially horizontal transport position, as shown in FIG. 1, to a non-horizontal working position, for example a vertical working position as shown in FIGS. 2 and 3a, 3b. This allows the pump body to be positioned at any desired angle relative to the surface of the fluid reservoir, in order to accommodate a variety of reservoir edge conditions and surface heights.

In one embodiment, the frame 19 is adapted for connection to a farm tractor; however, in other embodiments, the frame may be adapted for connection to a truck or other vehicle. The frame 19 shown is adapted for connection to the farm tractor by a three-point hitch mechanism that is well known in the art; however, in other embodiments, the frame may be wheeled or otherwise mounted for independent connection to the farm tractor in order that it may be readily disconnected from the tractor and left in a desired location. Various means of connecting the pump to the farm tractor are known to persons skilled in the art.

The pump housing comprises a bottom rest 24 attached to a bottom thereof. The bottom rest is used to support the base of the pump against a bottom of the fluid reservoir and prevents damage to the housing when the pump is set down when not in use. The bottom rest 24 also provides a minimum spacing between the bottom of the fluid reservoir and the inlet 4. An access door 25 is provided proximal the bottom of the pump body 1. The access door is used to connect or dis-connect a pump drive means (not shown in FIG. 1) from a pump impeller 26 located within the housing 3, in a manner that will be further described hereinafter.

Referring to FIG. 2, the pump is shown in a substantially vertical working position. The frame cylinders 22b (22a not shown) are extended such that the first portion 19a of the frame and the pump body 1 are pivoted downwardly relative to the second portion 19b. The bottom rest 24 is positioned against the bottom of the fluid reservoir 27, ensuring that the housing 3 is not damaged and keeping a certain minimum spacing between the bottom of the reservoir 27 and the pump inlet 4 in the bottom of the housing. A cutaway portion of the body 1 shows a pump drive means comprising a rigid Power Take-Off (PTO) shaft 28 that is connected to the tractor via a PTO connector 29. A flexible knuckle (not shown) behind the connector allows the rotation of the PTO connector 29 to be translated down the shaft 28 to the impeller 26. The access door 25 is used to detach the shaft 28 from the impeller for maintenance purposes. The shaft 28 is of a telescoping type that permits its length to be adjusted with changes in length of the pump body 1.

Referring to FIGS. 3a and 3b, in FIG. 3a the cutaway portion of the body 1 shows a hydraulic body cylinder 30 in a retracted position. The body cylinder 30 may be extended, as shown in FIG. 3b, along the longitudinal axis 11 to change the length of the pump body 1, the fluid conduit 2 and the PTO shaft (28, not shown in FIGS. 3a and 3b), which are all telescopic. This allows the depth of the pump to be increased in the event that the fluid reservoir 27 is deeper, as shown in FIG. 3b. By accommodating variable depth and variable entrance angle (by adjustment of the angle between the first portion 19a of the frame relative to the second portion 19b) a variety of different types of reservoir edge conditions and depths can be accommodated.

Figure 4A:
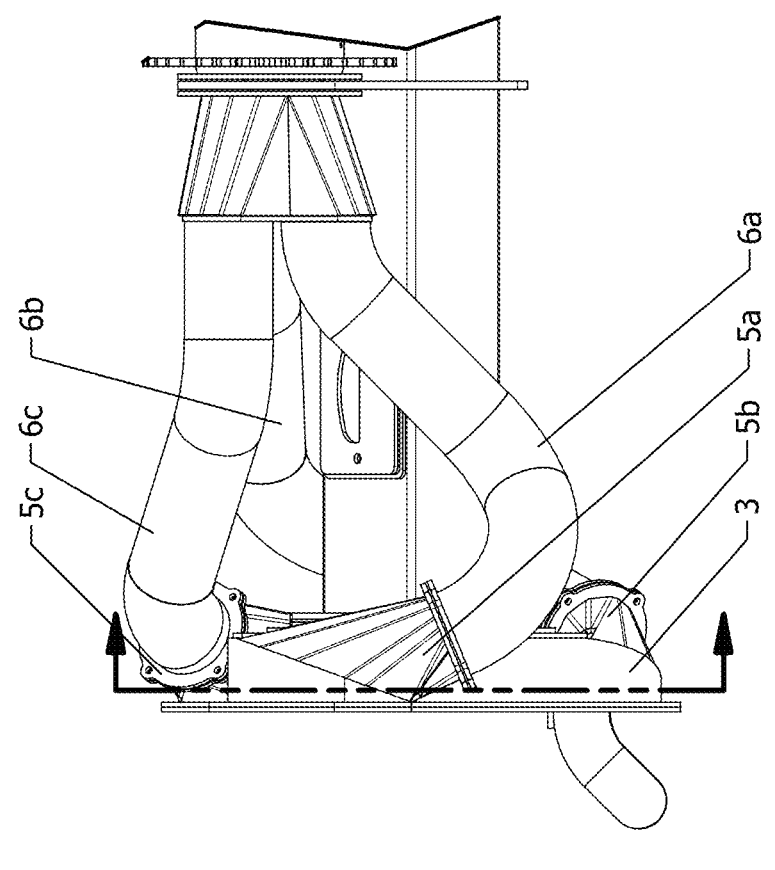
FIG. 4a shows a side view of a pump housing according to the invention.
Figure 4B:
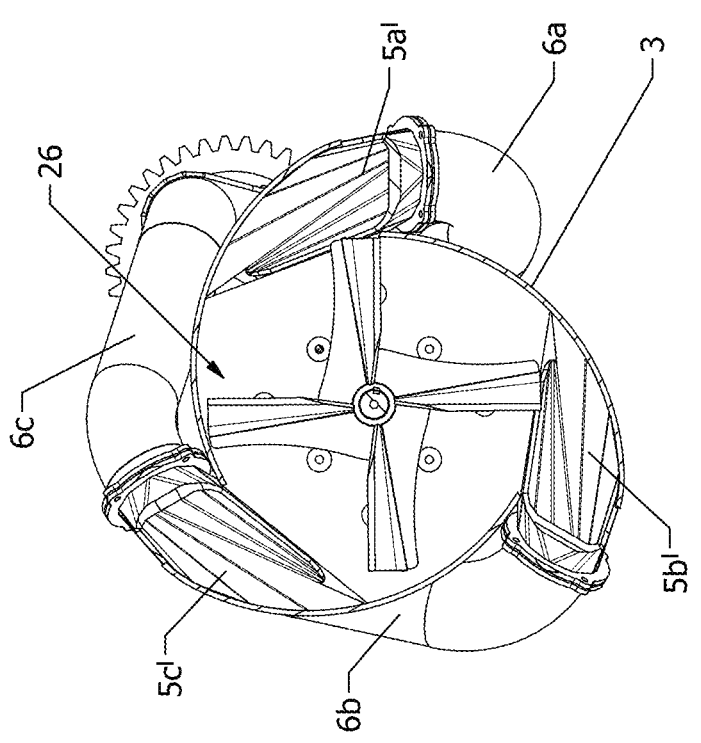

Referring to FIG. 4a, the housing 3 is shown in greater detail. The outlets 5a, 5b, 5c are tangential to the radius of the housing and are also angled upwardly, relative to when the housing is in a working position. In conventional pump housings, fluid exits tangentially and is then required to execute a 90° bend; by providing an upward angle to the tangential housing, a more gradual transition is created, resulting in less fluid pressure loss. Referring additionally to FIG. 4b, it can also be seen that providing the upward angle to the tangential outlets 5a, 5b, 5c results in a much larger opening area, denoted as 5a', 5b', 5c' within the housing. This opening area 5a', 5b', 5c' eventually constricts down to the diameter of the outlet conduits 6a, 6b, 6c. However, by providing a larger opening area within the housing and gradually transitioning to a smaller opening area, fluid pressure drop is reduced. The tangential fluid outlets 5a', 5b', 5c' therefore allow higher flow rates for a given power input due to the upward angle, which makes the upward turn more gradual and creates a larger opening within the housing that gradually transitions to the outlet connector diameter. The impeller 26 is also shown.

For manure pumping applications, in particular, it is known that fluid conduits and pump outlets having diameters of less than about 5" are prone to plugging with debris. It is important to provide a certain minimum outlet area in order to reduce pump pressure drop and energy loss for a given flow rate. It has been found that use of multiple smaller outlets allows the desired minimum outlet area to be provided, while advantageously allowing the impeller size to be reduced as compared with a single opening. This leads to a reduction in the power required to provide a certain flow rate. An alternative approach is to provide a larger or similar sized impeller as would be used with a single outlet opening and realize an increased flow rate through the pump at a given power input. The multiple outlet configuration thereby co-operates with the impeller design to provide a number of potential benefits, according to the application requirements.

Figure 5:
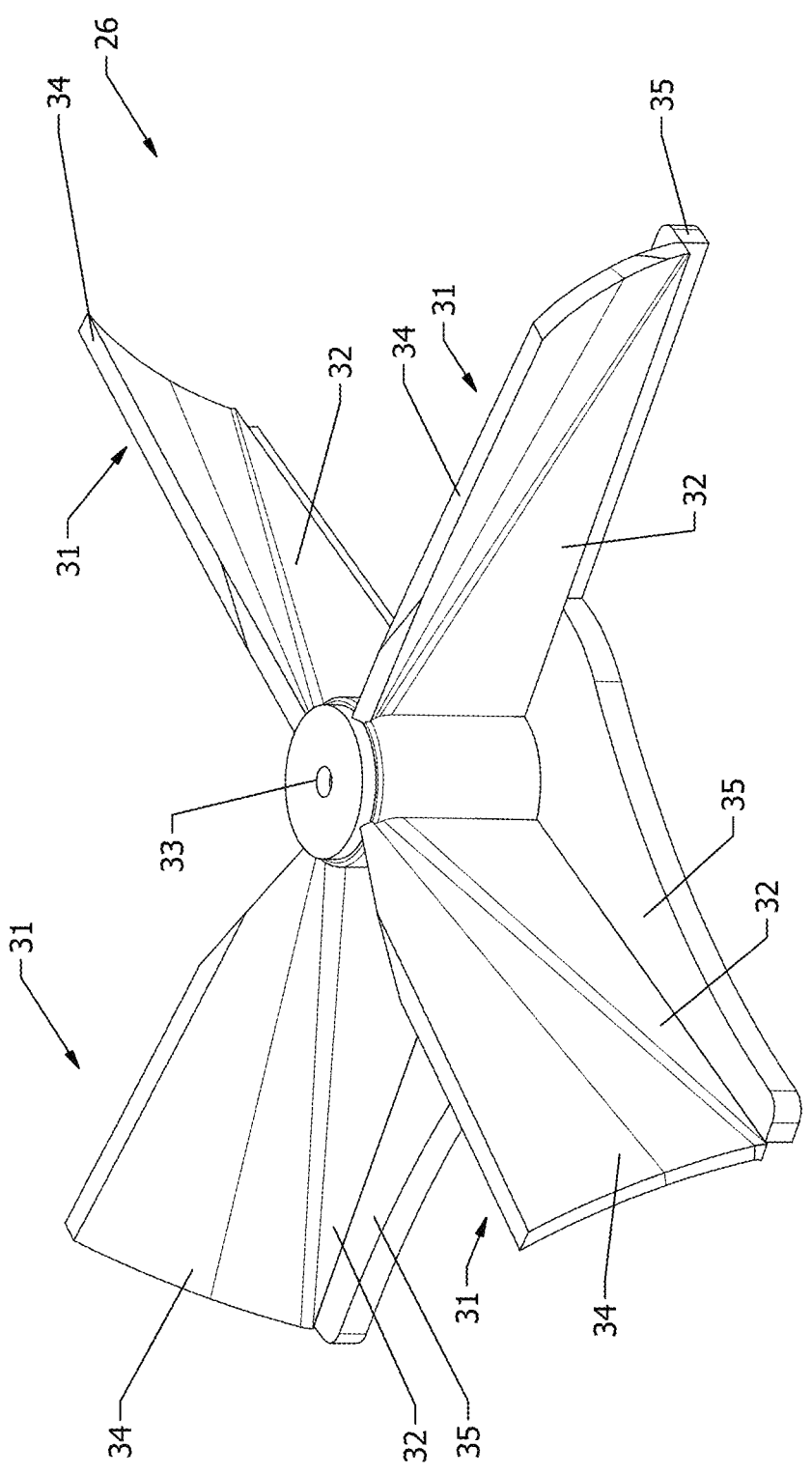
FIG. 5 shows an impeller of a pump according to the invention.

Referring additionally to FIG. 5, the impeller 26 is shown in greater detail. It can be seen that each of the vanes 31 comprises a flat portion 32, perpendicular to the direction of rotation of the impeller 26 (clockwise about the center 33), and a curved portion 34 that is curved forwardly in the direction of travel. The area of the curved portion 34 and thus the degree of curvature increases progressively with distance from the center 33 of the impeller. This has the effect of directing the fluid both tangentially and upwardly, towards the upwardly angled outlets 5a, 5b, 5c. Since the fluid is already being directed upwardly by the impeller 26, the result is less fluid pressure loss upon entering the outlets 5a, 5b, 5c than would otherwise occur if a directional change were induced solely due to friction between the fluid and the housing 3. The forwardly curved vane portion 34 therefore co-operates synergistically with the housing, specifically the upwardly angled tangential outlets 5a, 5b, 5c, to reduce pressure loss and therefore provide a greater flow rate for a given power input than would otherwise be obtained.

Returning briefly to FIG. 1, due to the enhanced flow rate provided by the design of the housing 3 and impeller 26, the pump inlet 4 in the bottom of the housing is preferably provided as a single central opening having a diameter that is at least a third of the diameter of the housing, more preferably at least half the diameter of the housing. This over-sized pump inlet allows the desirable high fluid flow rate to pass through the pump without internal cavitation. Resuming with FIGS. 4-5, in order to prevent pump inefficiency due to fluid short circuiting at the center of the impeller 26, the lower edge of each vane 31 is equipped with a blocking plate 35 that is perpendicular to the flat portion 32. The plate 35 has a curved edge and increases in area towards the center 33 of the impeller 26. The blocking plate 35 has the effect of occluding some of the area of the inlet 4 near the center 33 to prevent short-circuiting of fluid between the vanes 31 due to the large area of the inlet 4. This illustrates yet another manner in which the design of the impeller 26 co-operates with the design of the housing 3 to improve pump performance.

Figure 9:
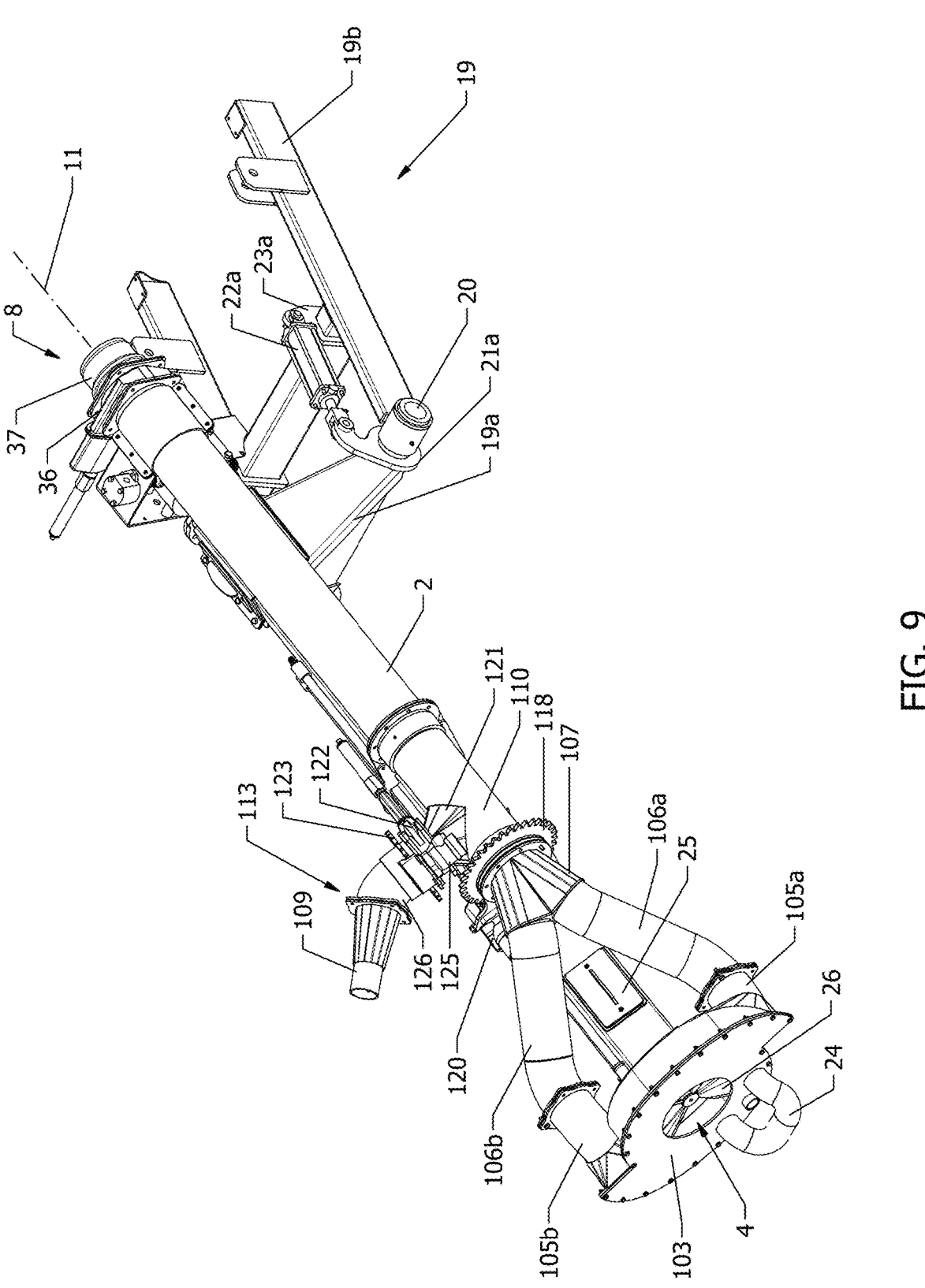
FIG. 9 shows a perspective view of another embodiment of a pump according to the invention having two fluid outlets.

Referring to FIG. 9, a pump according to the invention is shown that is similar in most respects to the pump described with reference to FIGS. 1-8, with features denoted by like reference numerals. However, the housing 103 has two fluid outlets 105a, 105b. The fluid outlets 105a, 105b are connected to two connectors 106a, 106b that meet at a substantially Y-shaped combiner 107. The function and operation of the remaining components are otherwise similar.

Figure 10:
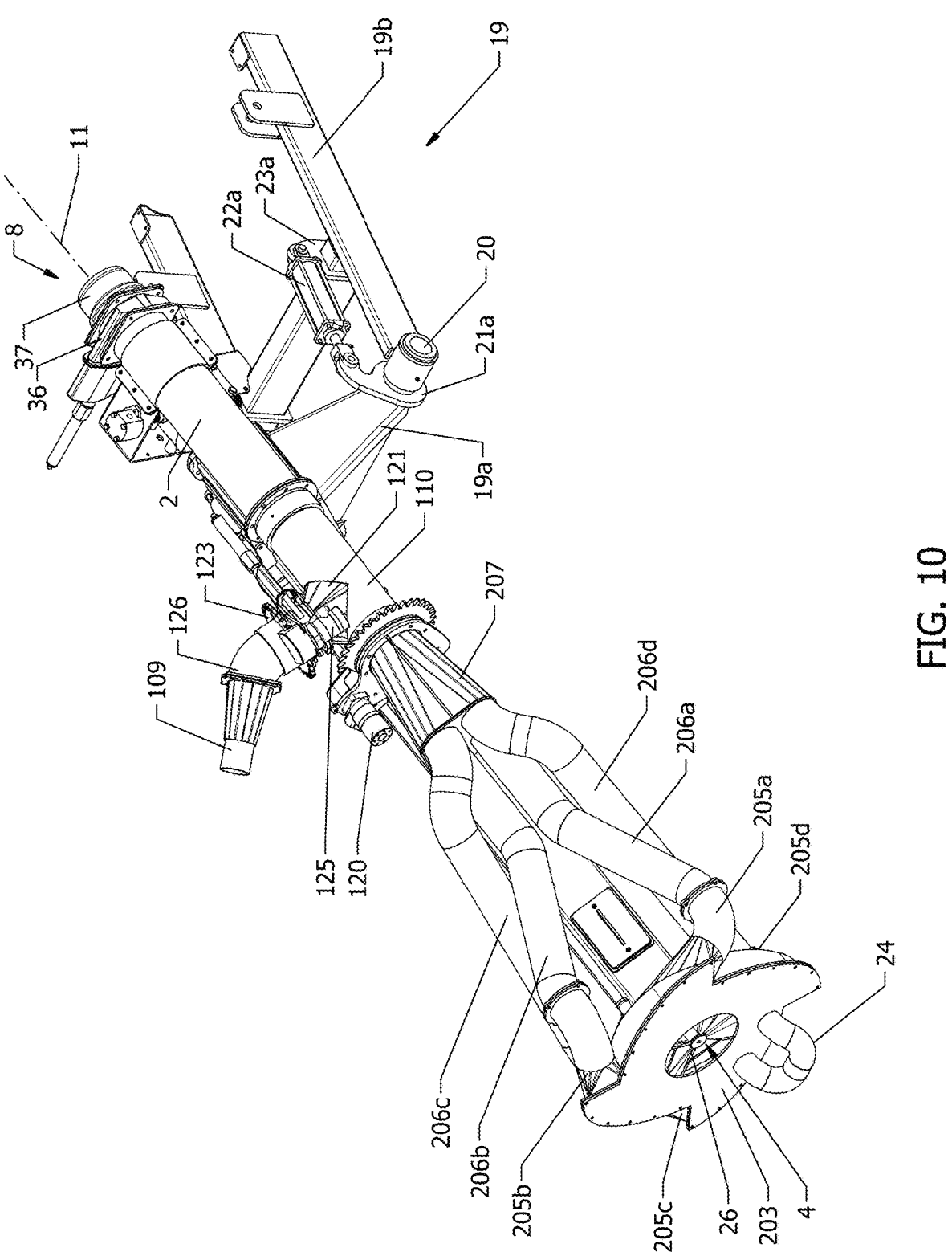
FIG. 10 shows a perspective view of yet another embodiment of a pump according to the invention having four fluid outlets; and, FIG. 11 shows a perspective view of yet another embodiment of a pump according to the invention, having an alternative nozzle orientation means.

Referring to FIG. 10, a pump according to the invention is shown that is similar in most respects to the pump described with reference to FIGS. 1-8, with features denoted by like reference numerals. However, the housing 203 has four fluid outlets 205a, 205b, 205c, 205d. The fluid outlets 205a, 205b, 205c, 205d are connected to four connectors 206a, 206b, 206c, 206d that meet at a combiner 207. The function and operation of the remaining components are otherwise similar.

Figure 11:
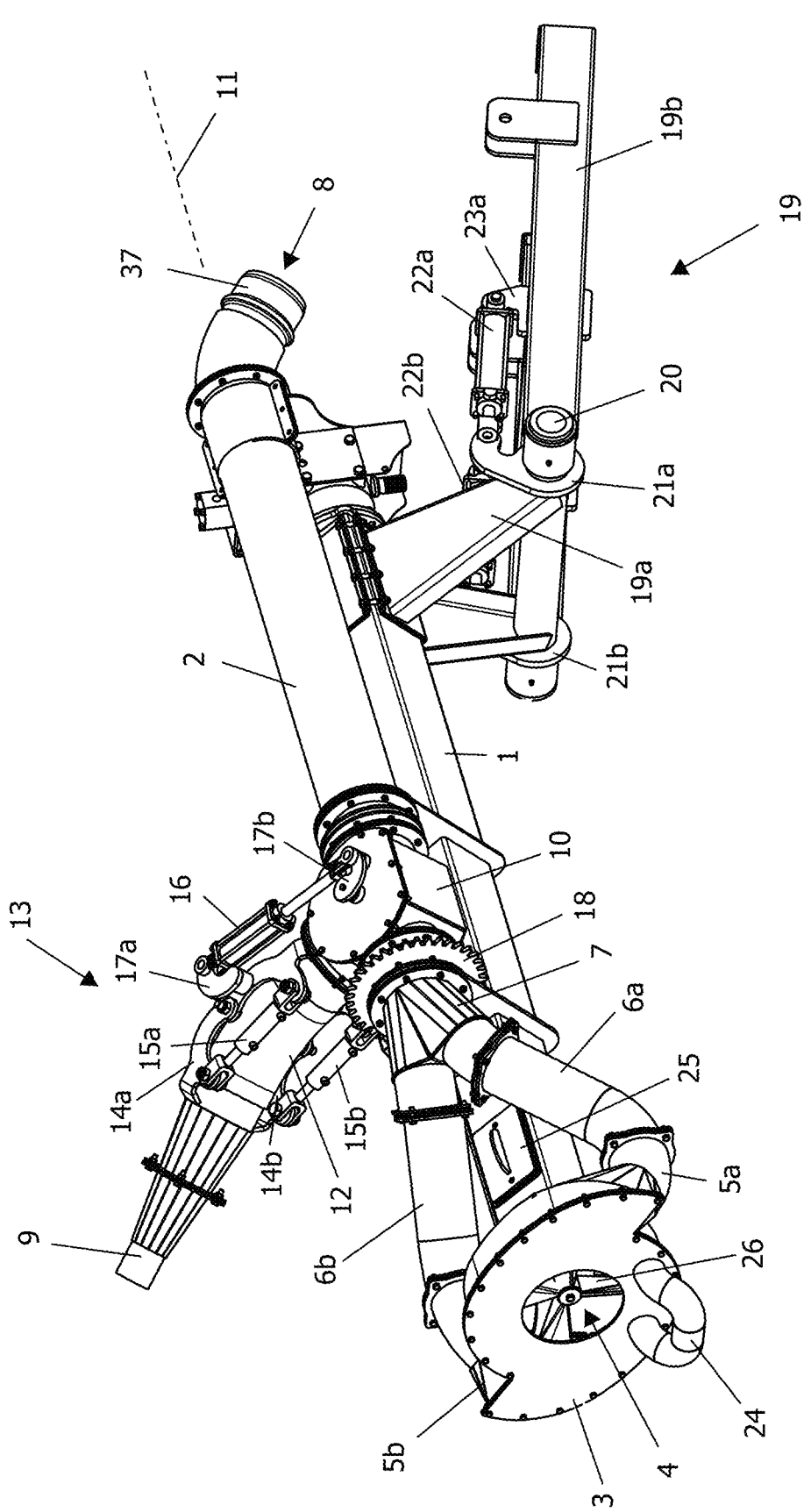

Referring to FIG. 11, a pump as described with reference to FIG. 9 is shown. However, the fluid conduit 2 comprises a nozzle body 10 to which is connected an agitator nozzle 9. The nozzle body 10 provides a fluid connection between the fluid conduit 2 and the nozzle 9 via a flexible connector 12. The flexible connector 12 may be made from, for example, an elastomeric material. The flexible connector 12 allows the angular orientation of the nozzle 9 to be adjusted relative to the longitudinal axis 11.

A nozzle orientation means 13 is provided for effecting this adjustment in orientation. In the embodiment shown, the orientation means 13 comprises a pair of C-shaped linkages 14a, 14b located on either side of the nozzle 9 and connecting the nozzle 9 to the nozzle body 10. The C-shaped linkages 14a, 14b are each actuated by a pair of hydraulic linkage cylinders 15a, 15b. Each C-shaped linkage pivots in the middle upon actuation of the cylinders to open or close, thereby adjusting the angular orientation of the nozzle 9 relative to the pump body. However, due to limitations in the stroke of the linkage cylinders 15a, 15b, the orientation means also comprises an orientation cylinder 16 interconnected by orientation linkages 17a and 17b with one of the C-shaped linkages 14a and the nozzle body 10. The orientation cylinder 16 permits larger macro adjustments to be made to the orientation of the nozzle 9, whereas the smaller linkage cylinders 15a, 15b permit fine adjustments to be made.

The nozzle body 10, and therefore the nozzle 9, are rotatable about the longitudinal axis 11. The nozzle body 10 includes sealing means, such as O-rings, to prevent fluid leakage at the site of rotation. The nozzle body comprises a nozzle sun gear 18, which is engaged by a nozzle moon gear (not shown in FIG. 11) that is driven by a hydraulic motor (not shown in FIG. 11). Activation of the motor in a clockwise or counter-clockwise direction causes an opposite rotation of the sun gear 18 and the nozzle body 10. By adjustment of both the rotation of the nozzle body 10 about the longitudinal axis 11 and the angular orientation of the nozzle 9, any desired orientation of the nozzle may be created relative to the pump.

The foregoing describes preferred embodiments of the invention and is not meant to be construed in a limiting sense. Persons skilled in the art will readily appreciate other variants and mechanical equivalents that may achieve the objects and advantages of the present invention without departing from the scope of the accompanying claims.

The invention claimed is:

1. A liquid manure pump comprising:

a frame;

a fluid conduit coupled to the frame;

a housing located at a bottom end of the liquid manure pump, the housing comprising a liquid manure inlet and at least two liquid manure outlets, the housing configured to be immersed in a liquid manure reservoir, the at least two liquid manure outlets directing liquid manure tangentially and upwardly of the housing;

a combiner for creating a liquid manure connection between the at least two liquid manure outlets and the fluid conduit;

an impeller located within the housing;

a drive shaft connected to the impeller, the drive shaft providing motive power to the impeller to direct the liquid manure from the liquid manure inlet to the at least two liquid manure outlets; and, an agitator nozzle, in fluid communication with at least one of the liquid manure outlets, for directing a portion of the liquid manure outwardly from the pump, the agitator nozzle comprising a nozzle orientation means, the nozzle orientation means comprising a C-shaped linkage connecting a nozzle of the agitator nozzle to a nozzle body of the agitator nozzle, the nozzle orientation means further comprising an orientation cylinder interconnected by orientation linkages with the C-shaped linkage and the nozzle body.

2. The pump of claim 1, wherein the at least two liquid manure outlets direct the liquid manure upwardly from the housing at an angle of from 20 to 70 degrees relative to a plane of rotation of the impeller.

3. The pump of claim 2, wherein the angle is from 30 to 60 degrees.

4. The pump of claim 2, wherein the angle is from 40 to 50 degrees.

5. The pump of claim 1, wherein the at least two liquid manure outlets comprise three outlets.

6. The pump of claim 1, wherein the impeller comprises vanes and each vane has a curved side profile such that rotation of the impeller causes the liquid manure to follow a curvature of the vane and directs the liquid manure tangentially to a direction of the rotation and upwardly along the vane.

7. The pump of claim 6, wherein each of the vanes comprises a flat portion perpendicular to the direction of rotation of the impeller and a curved portion that is curved forwardly in a direction of travel, whereby the area of the curved portion increases progressively with distance from a center of the impeller.

8. The pump of claim 7, wherein a lower edge of each vane comprises a blocking plate that is perpendicular to the flat portion.

9. The pump of claim 8, wherein, the plate has a curved edge and increases in area towards the center of the impeller.

10. The pump of claim 1, wherein the liquid manure inlet comprises a single inlet in a bottom of the housing.

11. The pump of claim 10, wherein the liquid manure inlet has a diameter at least one third of a diameter of the housing.

12. The pump of claim 11, wherein the diameter of the liquid manure inlet is at least half of the diameter of the housing.

13. The pump of claim 10, comprising a bottom rest positioned against a bottom of the liquid manure reservoir to provide a spacing between the liquid manure inlet and a bottom of the liquid manure reservoir.

14. A liquid manure pump comprising:

a frame;

a fluid conduit coupled to the frame;

a housing located at a bottom end of the liquid manure pump, the housing comprising a liquid manure inlet and at least two liquid manure outlets, the housing configured to be immersed in a liquid manure reservoir, the at least two liquid manure outlets directing liquid manure tangentially and upwardly of the housing;

a combiner for creating a liquid manure connection between the at least two liquid manure outlets and the fluid conduit;

an impeller located within the housing;

a drive shaft connected to the impeller, the drive shaft providing motive power to the impeller to direct the liquid manure from the liquid manure inlet to the at least two liquid manure outlets; and, an agitator nozzle, in fluid communication with at least one of the liquid manure outlets, for directing a portion of the liquid manure outwardly from the pump, the agitator nozzle comprising a nozzle orientation means, the nozzle orientation means comprising C-shaped linkages connecting a nozzle of the agitator nozzle to a nozzle body of the agitator nozzle, the nozzle orientation means further comprising hydraulic linkage cylinders connected to the C-shaped linkages, the hydraulic linkage cylinders operable to adjust angular orientation of the nozzle.

* * * * *